(12) United States Patent
Osaku et al.

(10) Patent No.: US 7,058,726 B1
(45) Date of Patent: Jun. 6, 2006

(54) METHOD AND SYSTEMS FOR ACCESSING INFORMATION ON A NETWORK USING MESSAGE ALIASING FUNCTIONS HAVING SHADOW CALLBACK FUNCTIONS

(75) Inventors: Teizo Osaku, Kawaguchi (JP); Yoshihiro Yoshinaga, Niiza (JP)

(73) Assignee: Internet Number Corporation, Tokyo (JP)

( * ) Notice: Subject to any disclaimer, the term of this patent is extended or adjusted under 35 U.S.C. 154(b) by 0 days.

(21) Appl. No.: 09/566,443

(22) Filed: May 8, 2000

Related U.S. Application Data

(63) Continuation-in-part of application No. 08/959,371, filed on Oct. 28, 1997, now Pat. No. 6,061,738, which is a continuation-in-part of application No. 08/883,148, filed on Jun. 27, 1997, now abandoned.

(30) Foreign Application Priority Data

Jul. 8, 1996 (JP) ................................. 8-177822
Jan. 17, 1997 (JP) ..................................... 9-6261

(51) Int. Cl.
*G06F 15/16* (2006.01)

(52) U.S. Cl. .................... 709/245; 709/219; 707/10; 395/200.59; 235/375

(58) Field of Classification Search ................ 709/245, 709/219; 707/10; 395/200.59; 235/375
See application file for complete search history.

(56) References Cited

U.S. PATENT DOCUMENTS 5,287,498 A  2/1994 Perelman et al. ........... 395/600

(Continued)

FOREIGN PATENT DOCUMENTS

EP  0817099 A2  1/1998

(Continued)

OTHER PUBLICATIONS

Hartman et al., "*Index-based hyperlinks*", Computer Networks And ISDN Systems, vol. 29, No. 8-13, p. 1229-1135, Sep. 1, 1997.

(Continued)

*Primary Examiner*—David Wiley
*Assistant Examiner*—Thanh T Nguyen
(74) *Attorney, Agent, or Firm*—Law Office of Albert J. Dalhuisen

(57) ABSTRACT

The present invention provides methods and systems for accessing a network URL through a pre-assigned simplified network address, correlating to the URL, and for displaying the home page having the URL as its address. These methods and systems provide easier URL and home page access because persons wanting to access the home page need only input the simplified network address, thereby avoiding the need to know and input the URL character string. The simplified network addresses of the present invention include numbers. Methods are provided for selecting numbers for assignment to URLs. The URL and home page access and display methods of the present invention include: assigning a simplified network address such as a number to a URL, storing the URL and number conversion in a network accessible storage system, inputting the assigned number in a network accessible computer, communicating the inputted number to the storage system, converting the number to the URL, retrieving the home page corresponding to the URL and displaying the home page on the computer. Additionally, the invention provides methods for use in message passing operating systems wherein system level messages to specific objects are intercepted, creating an alias message. The invention further defines networked systems and methods for operating the networked systems that rely on the interception and rule-based modification of messages passing between system applications.

8 Claims, 28 Drawing Sheets

U.S. PATENT DOCUMENTS

| | | | | |
|---|---|---|---|---|
| 5,404,393 | A | | 4/1995 | Remillard ............... 379/96 |
| 5,740,230 | A | | 4/1998 | Vaudreuil ............... 379/88 |
| 5,761,280 | A | | 6/1998 | Noonen et al. ........ 379/93.27 |
| 5,764,906 | A | * | 6/1998 | Edelstein et al. ........ 709/219 |
| 5,764,910 | A | | 6/1998 | Shachar ............... 395/200.53 |
| 5,778,368 | A | * | 7/1998 | Hogan et al. ............ 707/10 |
| 5,804,803 | A | * | 9/1998 | Cragun et al. ........... 235/375 |
| 5,812,776 | A | | 9/1998 | Gifford ............... 395/200.47 |
| 5,838,458 | A | | 11/1998 | Tsai ................... 358/402 |
| 5,862,348 | A | * | 1/1999 | Pedersen ............... 709/229 |
| 5,875,296 | A | | 2/1999 | Shi et al. ............ 395/188.01 |
| 5,930,801 | A | | 7/1999 | Falkenhainer et al. ..... 707/103 |
| 5,987,508 | A | | 11/1999 | Agraharam et al. ....... 709/217 |
| 6,009,459 | A | | 12/1999 | Belfiore et al. .......... 709/203 |
| 6,061,738 | A | * | 5/2000 | Osaku et al. ........... 709/245 |

FOREIGN PATENT DOCUMENTS

| | | | |
|---|---|---|---|
| EP | | 0953926 A2 | 11/1999 |
| WO | WO 97/19564 | | 5/1997 |
| WO | WO 97/28553 | | 8/1997 |
| WO | WO 97/37319 | | 10/1997 |
| WO | WO98/03923 | | 1/1998 |
| WO | WO99/39280 | | 8/1999 |

OTHER PUBLICATIONS

"*Best Web Browser*", PC World, vol. 14, No. 8, p. 136, 138, 139, 142, 146, 148 Aug. 1996.

European Patent Office European search report mailed Feb. 5, 2004, regarding corresponding EP Application No. 01401172.0-2413-.

European Patent Office, Office Action dated Aug. 8, 2003, regarding corresponding EP Application No. 98 950 398.2-2415.

* cited by examiner

FIG. 17

| ALPHABETIC LETTER \ REFERENCE NUMBER | 1 | 2 | 3 | 4 | 5 | 6 | 7 | 8 | 9 |
|---|---|---|---|---|---|---|---|---|---|
| abc | 2 | 1 | 9 | 8 | 7 | 6 | 5 | 4 | 3 |
| def | 3 | 2 | 1 | 9 | 8 | 7 | 6 | 5 | 4 |
| ghi | 4 | 3 | 2 | 1 | 9 | 8 | 7 | 6 | 5 |
| jkl | 5 | 4 | 3 | 2 | 1 | 9 | 8 | 7 | 6 |
| mno | 6 | 5 | 4 | 3 | 2 | 1 | 9 | 8 | 7 |
| prs | 7 | 6 | 5 | 4 | 3 | 2 | 1 | 9 | 8 |
| tuv | 8 | 7 | 6 | 5 | 4 | 3 | 2 | 1 | 9 |
| wxy | 9 | 8 | 7 | 6 | 5 | 4 | 3 | 2 | 1 |
| zq | 9 | 9 | 8 | 7 | 6 | 5 | 4 | 3 | 2 |

FIG. 18

| Rule of Assignment / Alphabetic Letter | Digit | Example |
|---|---|---|
| smhbyvq | Upper 2nd | |
| ncjfrlx | Upper 3rd | n(6) |
| tkpdgwz | Upper 4th | t(7)+t(6)=13 |
| aiueo | Upper 5th | |

METHOD AND SYSTEMS FOR ACCESSING INFORMATION ON A NETWORK USING MESSAGE ALIASING FUNCTIONS HAVING SHADOW CALLBACK FUNCTIONS

REFERENCE TO RELATED APPLICATION

This application is a continuation-in-part of U.S. patent application Ser. No. 08/959,371, filed Oct. 28, 1997, now U.S. Pat. No. 6,061,738 which is a continuation-in-part of U.S. patent application Ser. No. 08/883,148, filed Jun. 27, 1997, abandoned.

FIELD OF THE INVENTION

The invention relates to the fields of information processing and communications systems, and in particular to a system and to methods for simplifying access to network information and for commanding network servers.

BACKGROUND OF THE INVENTION

An Internet home page generally represents the top-level document at a particular Internet site. A Uniform Resource Locator (URL) provides the global address or location of the home page.

Currently, there are several well known techniques for accessing an Internet home page from a remote computer which is linked to the Internet. For example, a search engine, such as YAHOO!® (a registered trademark of Yahoo!, Inc.) can be used. Also, it is common for computer users to store a URL in a computer file generally known as a bookmark. The bookmark is then used for accessing a particular home page. Different URL addresses can be linked by Hyper Text Markup Language HTML) and these can be accessed through a description which is displayed on the computer. None of the above accessing techniques require any knowledge of the specific URL.

However, there are instances where a computer user who desires to access a certain home page needs to input a URL to a computer. For example, when the computer user obtains the URL from a printed publication. It has been found that this process presents unexpected difficulties because it requires computer inputting of the URL alphabetical characters which are usually in a long and complex character string. Also, it is difficult to remember these long and complex character strings, particularly when it is necessary to distinguish uppercase letters from lowercase letters.

Additionally, URLs are becoming more and more complex due to the unexpected increase in the number of home pages. As a result of the increasing complexity of URLs, a user may have difficulty inputting a URL from, for example, a newspaper advertisement while holding the newspaper in one hand. Let alone remembering the URL.

While applications exist which add functionality to a browser, no existing applications monitor input to the browser application's location (address) field in order to add extra functionality. A similar value adding application is QuickSeek™ (a trademark used by Infoseek Corporation) from INFOSEEK® (a registered trademark of Infoseek Corporation), but rather than obtaining input from the browser's location field, it adds its own separate input field to the browser.

Accordingly, the need exists for methods and systems which facilitate accessing network home pages through URLs.

SUMMARY OF THE INVENTION

The present invention provides novel methods and systems for accessing a network URL through pre-assigned, simplified network addresses, often using a single number of one or more digits, and for then displaying the home page corresponding to the simplified network address.

In one embodiment, the present invention provides methods for using a simplified network address composed of characters or digits which are easy to remember and input. The methods permit a URL owner or other party to create a new simplified network address having a URL correspondence relation. Alternatively, methods are provided to assign a unique simplified network address to a URL.

In another embodiment, the simplified network address is a number having one or more digits. A variety of methods for selecting and for automatically assigning such a number are presented.

In another embodiment the current invention provides methods and systems for storing the URL numeric code and the corresponding URL in a network accessible storage system.

In still another embodiment the present invention provides methods and systems which include inputting the URL numeric code in a network accessible computer, communicating the inputted number to the storage system, converting the number to the URL and sending the URL to the computer.

In a further embodiment the present invention provides methods and systems which include inputting the URL numeric code in a network accessible computer, communicating the inputted number to the storage system, converting the number to the URL, retrieving the home page corresponding to the URL and displaying the home page on the computer.

Another group of embodiments presents methods for use in message passing operating systems. The methods provide that system level messages to specific objects are intercepted and an alias message is created and substituted in place of the original message. Such message aliasing methods are used to provide simplified network addressing and also simplified commanding of a network server.

Further embodiments of the invention define networked systems and methods for operating the networked systems that rely on the interception and rule-based modification of messages passing between system applications. One group of embodiments relates to intercepting a simplified network address number, entered by a user, examining the number to determine which of several networked servers to send the number to for conversion to a corresponding URL. One embodiment examines the most significant digits of the number and compares these with stored digit patterns associated with each of the several number conversion servers.

Another group of embodiments relates to the collection, storage, and selective release of user personal information. One embodiment intercepts the user-entered simplified network addressing number and attaches user personal information to the number before sending the combined number/information to a number conversion server. A related embodiment applies a set of rules, either locally or at a remote server, to adjust the level, type and amount of user information according to access permissions of the intended recipient.

BRIEF DESCRIPTION OF THE DRAWINGS

FIG. 17 is a table defining a correspondence between alphabetic letters and Reference Numbers in a range from <1> through <9>.

FIG. 18 is another table defining a correspondence between groups of alphabetic letters and Rules of Assignment.

DETAILED DESCRIPTION OF THE INVENTION

Figure 1:
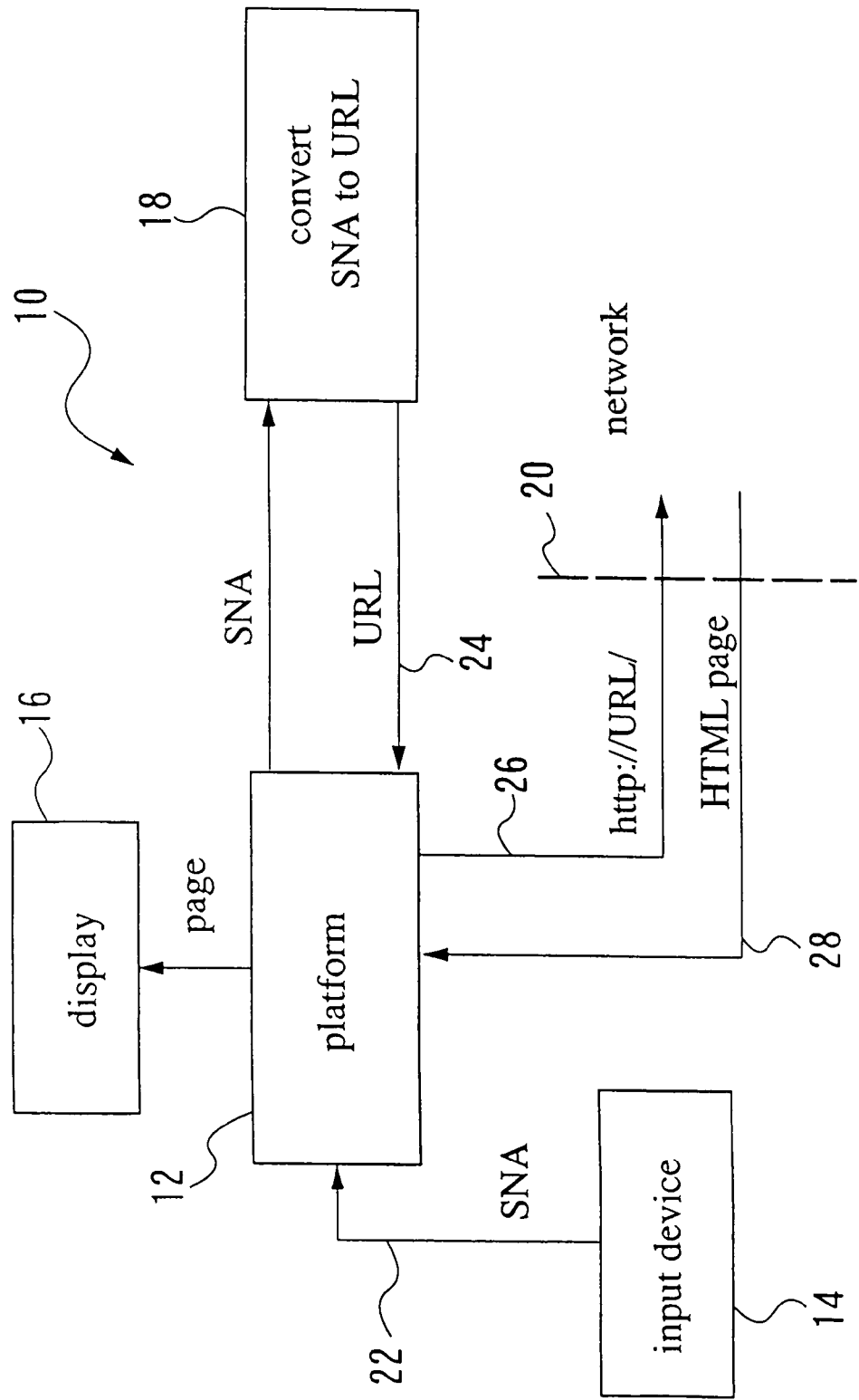
FIG. 1 is a block diagram illustrating a system which permits the use of simplified network addresses to access network information.

While describing the invention and its embodiments, certain terminology will be utilized for the sake of clarity. It is intended that such terminology include not only the recited embodiments but all equivalents which perform substantially the same function, in substantially the same manner to achieve substantially the same result.

Definitions

"URL numeric code" as defined herein includes a number which is assigned to a URL, this term can also be referred to as an "assigned number", a "numerically expressed URL" or an "original number".

"User" as defined herein includes a person or party accessing or intending to access a network to access network information, such as a URL or a Web home page.

"Client" as defined herein includes hardware and software which is utilized by a user to access a network to receive a URL or a Web home page.

"Simplified network address" also referred to as SNA as defined herein includes alphanumeric characters, including URL numeric codes, control characters and special characters, such as ASCII characters having a standard control function, which a user inputs in a client to access network information, such as a URL or a Web home page, through a conversion of the simplified network address to a URL.

"Simplified network addressing" as defined herein includes methods of using a simplified network address for accessing network information.

"Platform" as defined herein includes a computer system's hardware and software.

"URL conversion domain" as defined herein includes a network domain name which identifies an address for accessing the conversion of a simplified network address to a URL.

Introduction

Existing methods for accessing homepages via a network browser necessitate the typing of a long URL string. This operation can be especially inconvenient and difficult for users of Internet Televisions and other keyboard-less devices. According to the present invention it has been discovered that the use of network URLs is greatly facilitated by assigning a number or other character string to a specific URL and then using this number or other character string to connect the user to the network home page site. By assigning a shorter, easier to type and to remember number to a corresponding URL, a user of the present invention can simply type in a number and have a corresponding homepage returned to the client display screen.

Internet browsers currently assume that any number input to the location (address) field is intended to be an IP address in the form <nnn.nnn.nnn.nnn>. Therefore, any number input to the location field which is not an IP address will cause the browser to return an error. For example, if a user enters a string <888> into a browser location field, an existing browser application will attempt to connect to the URL <http://888/>, which will result in an error since the string <888> is not a valid IP address. In several embodiments of the present invention which follow, a service program, monitoring user input, intercepts a message as it is sent to the browser location field. The service program recognizes that the string <888> is not a valid IP address and substitutes the following URL and forwards the substitute URL to the browser: <http://www.hatchusa.com/search.p?number=888&start=0>.

The substitute URL causes the browser to contact a www server in the hatchusa.com domain and to run the program <search.p> passing <888> as a parameter. Wherein hatchusa.com is an example of a URL conversion domain for accessing the conversion of a user's number input to a URL. A server side program <search.p> converts the number into a URL by looking up <888> in a database table and obtaining a corresponding URL and necessary HTTP formatting characters which are returned to the browser's location field. The browser, in turn, uses the returned HTTP-formatted URL to access the Internet homepage identified by the input string <888>, and displays the homepage on the client browser. String <888> is an example of a simplified network address of the current invention. A detailed examination of various features of the present invention follows.

Basic Network Access System

With respect to FIG. 1 there is shown a block diagram illustrating a system according to one aspect of the present invention. The system is designated generally by the numeral 10 and includes a platform 12, an input device 14, a display monitor 16, and a converter 18. The platform 12 is connected to a network 20 for accessing network information. In general, the system 10 receives a simplified network address (SNA) 22 via the input device 14 and forwards the simplified network address 22 to the converter 18. The converter 18 converts the simplified network address to a Uniform Resource Locator (URL) 24 and returns the URL 24 to the platform 12. The platform 12 then combines the returned URL 24 with additional symbols according to a network protocol to form a network access command 26 (e.g., http://URL/) for accessing information from a network resource (not shown). The network resource returns the accessed information 28 (e.g., an HTML page) to the system 10, where it is received by the platform 12 and processed for display on the display monitor 16.

In a related embodiment of the system 10 (not shown), the converter 18 converts the simplified network address 22 directly to the already formatted network access command 26, e.g. http://URL/.

The simplified network address 22 is typically a concatenation of symbols such as alphanumeric or purely numeric characters. These symbols are typically entered via an input device 14 such as a keyboard or a 10-key pad by a user. It is common to refer to the system 10 as a client. Typically, the client includes a programmable digital computer having a keyboard input device, a mouse pointing device, a CRT monitor display, internal memory (RAM) for storage of temporary results such as data, and external storage in the form of one or more hard disks for storage of programs and long-term results such as database tables. For purposes of the discussion which follows it is convenient to think of the system 10 as such a computer-based system. However, it should be kept in mind that the invention is not limited to the common desktop computer system and may find application in diverse platforms such as hand-held computing devices, for example so-called smart telephones.

A process for using the system 10 to access information located at a network resource uses a string which defines a simplified network address. For example, assume the user types the string <patent-search> on the input device 14. Assume the string <patent-search> is a simplified network address for accessing a patent database server at the United States Patent and Trademark Office. Thus, the user does not have to remember that the actual Uniform Resource Locator for the patent database is <http://patents.uspto.gov/>. The platform 12 receives the string 22 and sends it to the converter 18. The converter 18 accepts the simplified network address <patent-search> and converts the string to the URL <patents.uspto.gov>, using a pre-defined relationship between this URL and the simplified network address <patent-search>. The platform now uses the returned URL to form a complete network access command 26<http://patents.uspto.gov/>. In an alternate embodiment, the converter 18 converts the simplified network address to a fully formatted network access command, e.g. <http://patents.uspto.gov/>. Now, the system 10 issues the network access command 26 to the network 20. In due course, connection is established between the system 10 and a patent database server (not shown) which returns the patent database homepage 28 expressed in the HTML format. The platform receives the homepage 28, processes the HTML information permitting the homepage to be displayed on the system display monitor 16. In this example, the http://URL/ format is used for accessing information from a network such as the Internet and its World Wide Web (Web). In another specific embodiment, the network access command uses a different network protocol command for retrieving network information (e.g., a different TCP/IP protocol command).

Correspondence Relation

In one embodiment, the conversion of a simplified network address 22 to a URL 24 is accomplished by a database having storage and a search engine. Such an embodiment is illustrated in the block diagram of FIG. 2. The database is designated generally by the numeral 30, and it should be understood that the database 30 performs the functions assigned to the converter 18 of FIG. 1. The database 30 includes storage 32 and a search engine 34. The database 30 receives a simplified network address 36 provided by the platform 12 of FIG. 1, and returns a URL 38, which corresponds to the URL on line 24 of FIG. 1. In an alternate embodiment (not shown), the database 30 receives a simplified network address 36 and returns a fully formatted network access command, as described above.

Figure 2:
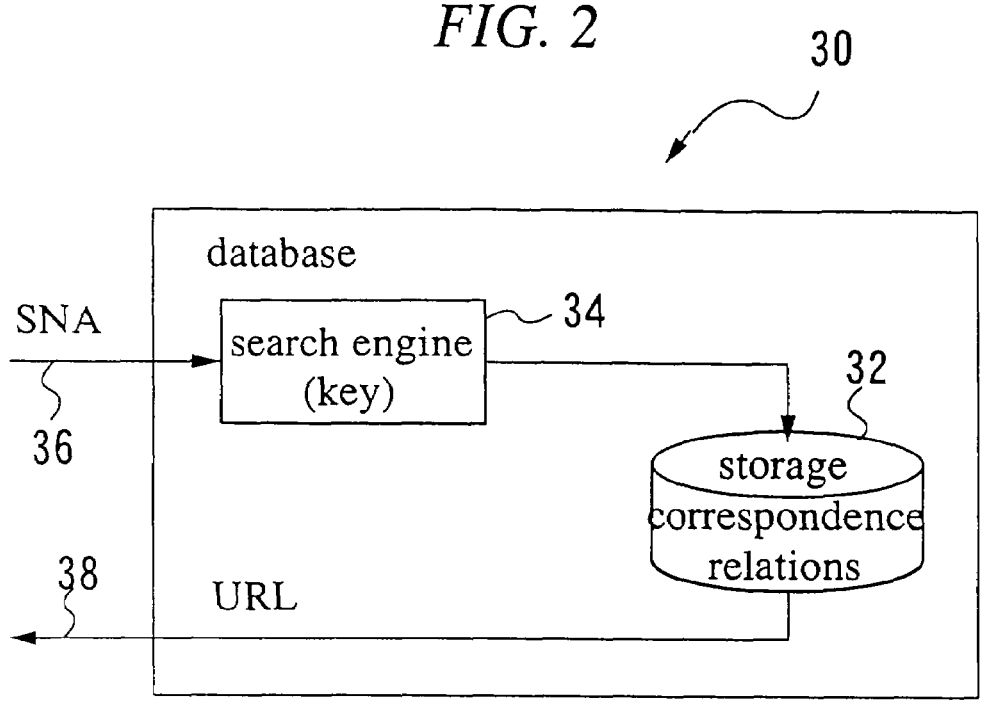
FIG. 2 is a block diagram illustrating a database system for converting a simplified network address to a corresponding URL and used in the system of FIG. 1.

The database 30 shown in FIG. 2 defines a correspondence relation between a received simplified network address 36 and a corresponding URL 38. Correspondence relations are stored in the database storage 32. The correspondence relation can be thought of as a database entry having two parts: a simplified network address portion and a corresponding URL portion. Such a correspondence relation is illustrated in the schematic diagram of FIG. 3. The correspondence relation is designated generally by the numeral 40. The correspondence relation 40 has a simplified network address portion 42 and a corresponding URL portion 44. An example of a specific embodiment of a correspondence relation is illustrated in FIG. 4. The correspondence relation is designated generally by the numeral 46. The simplified network address portion 48 is <patent-search>, while the corresponding URL portion 50 is <patents.uspto.gov>.

In general, such a correspondence relation means that when the database 30 (FIG. 2) receives a particular simplified network address, such as <patent-search> it will examine the correspondence relations within the database storage 32, and when it finds one having a string portion equal to the received simplified network address<patent-search> it will return the corresponding URL portion <patents.uspto.gov>. The database storage is searched using a search engine 34 which accepts the received simplified network address 36 and uses the simplified network address as a search key. In another embodiment of the correspondence relation 46 (not shown), the corresponding URL portion 50 includes all necessary network protocol formatting characters, e.g. <http://patents.uspto.gov/>.

Simple Table Lookup

Figure 3:
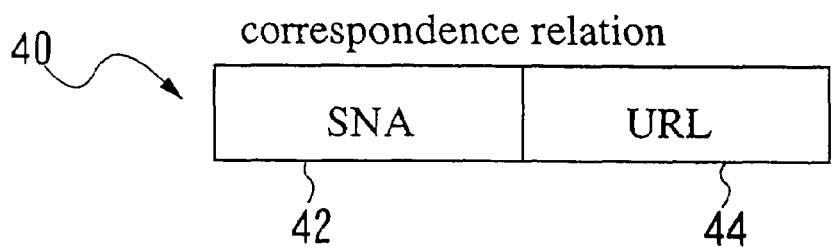
FIG. 3 is a schematic diagram showing a correspondence relation as a pair having a simplified network address portion and a corresponding URL portion for storage in the database of FIG. 2.
Figure 4:
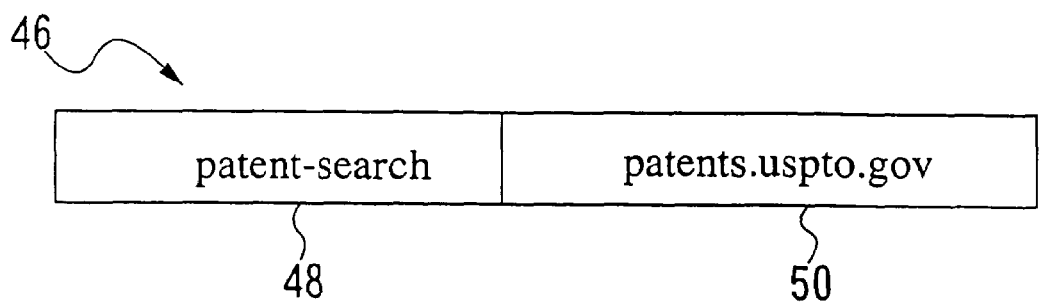
FIG. 4 is a schematic diagram providing an example of the pair of FIG. 3.

The simple pair correspondence relation used in the foregoing example and shown in FIGS. 3 and 4 are a specific embodiment of a correspondence relation. In other embodiments of the present invention, the correspondence relation, though easily understood in terms of the pair illustrated in FIGS. 3 and 4 is not actually stored in the database storage as a simple pair. But the process of using the search engine 34 to locate a URL corresponding to a received simplified network address 36 can still be relied upon for understanding the basic operation of the database 30.

One embodiment of the invention defines a process for converting a simplified network address to a URL using a database 30 having storage 32 of correspondence relations, and a search engine 34 for searching the database 32 and accepting a search key. The database 30 receives a simplified network address 36 which it provides to the search engine 34 as the search key. The search engine 34 searches the stored correspondence relations and returns a URL 38 corresponding to the search key. In this way, the received simplified network address 36 is converted to the corresponding URL 38. In terms of the example provided above, the search string <patent-search> is converted into the URL <patents.uspto.gov>. Again, in another specific embodiment of the database 30 (not shown) the search string <patent-search> is converted into a fully formatted network access command, e.g. <http://patents.uspto.gov/>.

Automatic Creation of Simplified Network Addresses

Figure 5:
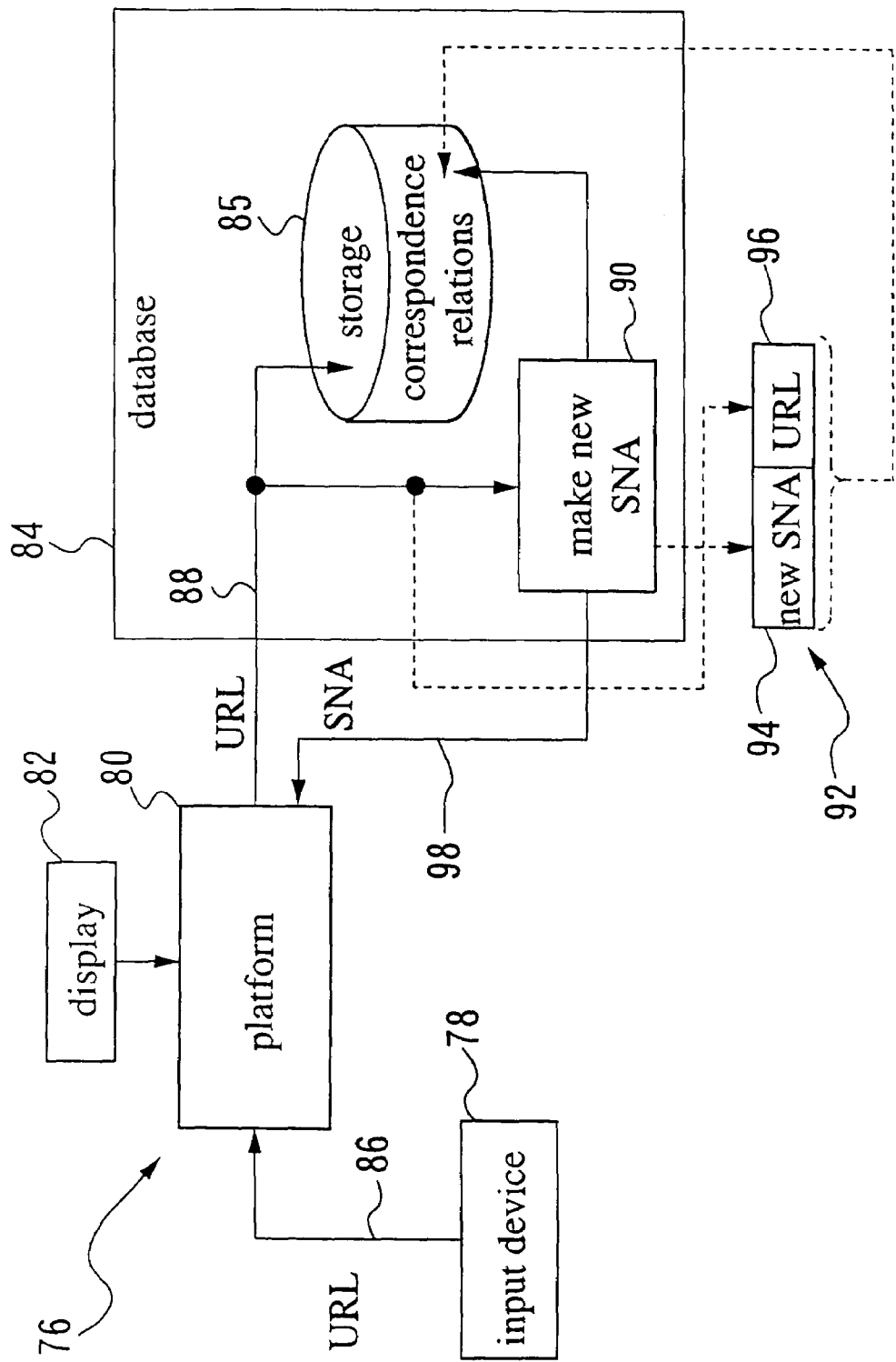
FIG. 5 is a block diagram showing an alternative system for updating the database of FIG. 2 and in which a simplified network address is automatically created.

A related embodiment of the invention defines a process permitting an owner of a URL to input an actual address of network information in the form of a URL and the system automatically creates a simplified network address. A system which embodies such a process is shown in FIG. 5, a block diagram which illustrates a portion of a system designated generally by the numeral 76. The system portion 76 includes an input device 78, a platform 80, a display monitor 82, and a database system 84 having storage 85 for correspondence relations.

The process defined by the related embodiment accepts an actual network address in the form of a URL 86 from a URL owner via the input device 78. The platform 80 receives the URL 86 and forwards the URL via line 88 to the database 84. In the embodiment illustrated in FIG. 5, the database system 84 includes an element 90 for generating a simplified network address in the form of a string. The database system 84 combines the formed string and the received URL to form a new correspondence relation, designated generally by the numeral 92. The formed correspondence relation 92 includes the generated string 94 defining the simplified network address and the received URL 96. The database system 84 then inserts the newly formed correspondence relation 92 into the database storage 85 where it becomes available for converting simplified network addresses to actual network addresses.

In an alternative embodiment (not shown), the element 90 for generating a new simplified network address is located in the system 76, but not within the database system 84. In this alternative embodiment, the process forms a completed database entry having both the simplified network address portion and the corresponding URL portion. The competed entry is then sent to the database system 84.

In another related alternative embodiment, the database system 84 returns a copy 98 of the new simplified network address 94 to the platform so that the URL owner is aware of the new simplified network address which corresponds to the URL he provided.

In another specific embodiment (not shown), the user inputs a fully formatted network access command, e.g. <http://patents.uspto.gov/>, and the system automatically creates a new simplified network address corresponding to the network access command.

Assigned Numbers: A URL Numeric Code

In a preferred embodiment, the simplified network address generated by the element 90 is a number having one or more digits and defining an assigned number. The assigned number, also referred to as a URL numeric code, will be described in more detail with reference to FIGS. 14 through 20.

Moving the Database to a Network

The systems illustrated in FIGS. 1 and 2 are expanded in another embodiment by moving the conversion database from the user's system out onto the network. An example of such an embodiment is illustrated in block diagram FIG. 6 which includes a client, designated generally by the numeral 100, and a network based conversion database, designated generally by the numeral 102. The client 100 includes a platform 104 having network access. The database 102 includes a server 106, a search engine 108, and database storage 110 providing storage for database correspondence relations.

Figure 6:
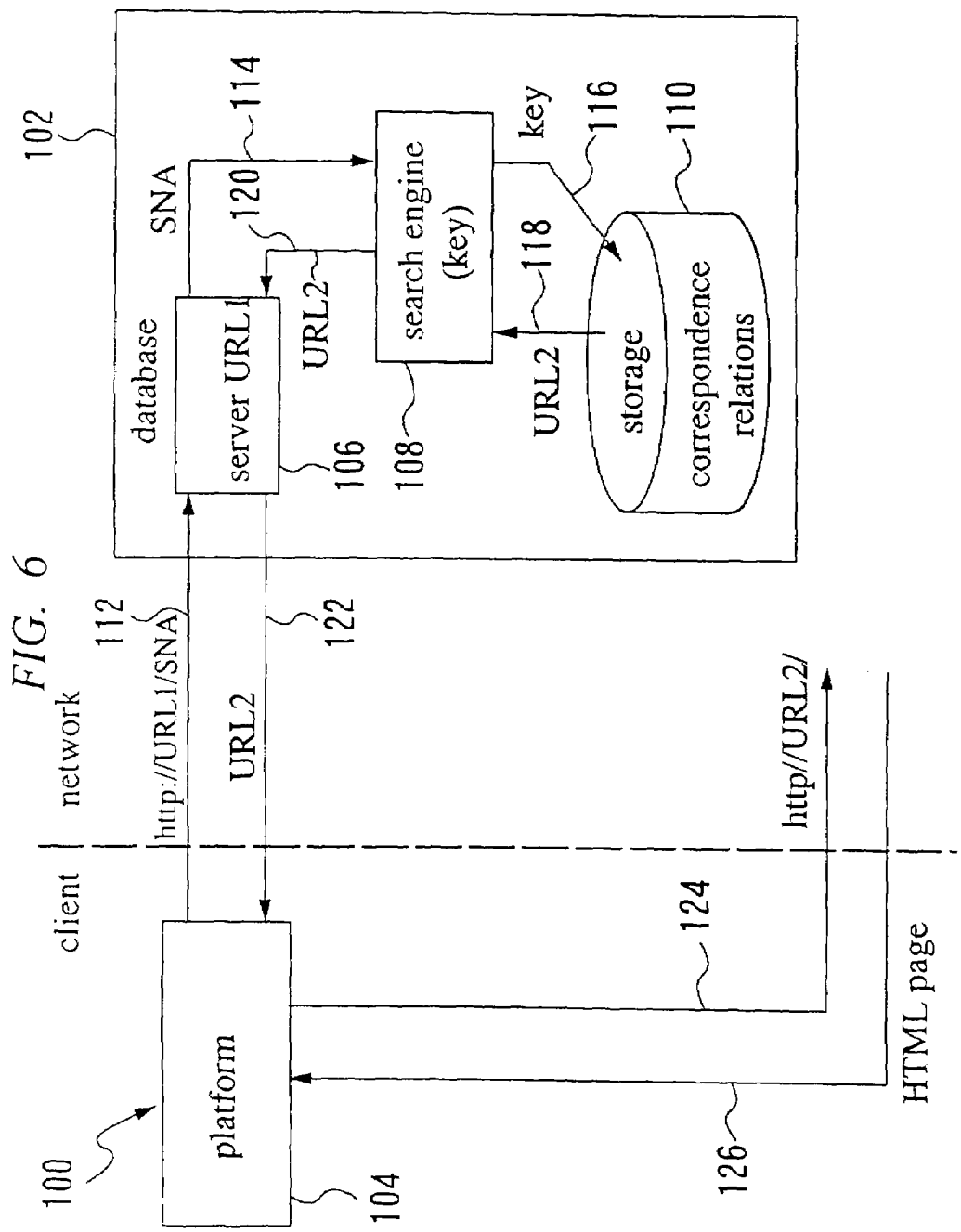
FIG. 6 is a block diagram illustrating a system as in FIG. 1 in which the database is located on a network and is accessed as a network resource.

One embodiment of the invention is a method for operating a simplified network addressing system using a conversion database which is accessible via the network. The method includes the steps of receiving a simplified network address and forming a network access command addressed to the conversion database 102. An example of such a command 112 is illustrated in FIG. 6. For this example it is assumed that the URL for accessing the conversion database 102 is <URL1>. The formed access command 112 incorporates URL1 with the received simplified network address to obtain an access command format<http://URL1/simplified network address/>, as will be described in more detail with reference to Function C of FIG. 11.

The server 106 receives the access command 112 via the network and presents a simplified network address portion 114 to the search engine 108. The search engine uses the simplified network address portion 114 as a search key 116 for searching the stored correspondence relations 110. The search engine 108 obtains a URL2 118 which corresponds to the search key 116, which in turn represents a simplified network address for a network resource having a URL equal to URL2. The search engine 108 returns the URL2 120 to the server 106, and the server then returns the URL2 122 to the client 100 via the network connection. The method now defines steps which use the returned URL2 to form a second network access command 124, which in this example has a form <http://URL2/>. The second network access command 124 is directed to a network resource upon which is stored a network page, in this example an HTML page 126, which is returned to the client via a network connection. Thus, URL1 in FIG. 6 represents the URL for accessing the network database 102, while URL2 represents the URL for the Web page which the user wants to access.

In the embodiment illustrated in FIG. 6, the client 100 began with a simplified network address corresponding to the returned HTML page 126, and the conversion database 102 converted the simplified network address to the URL2 122 which was needed to access the HTML page. The client 100 used the URL2 to form a network access command 124 and the network returned the desired HTML page 126.

In another embodiment of the simplified network addressing system, illustrated in the previous drawing figures, the conversion database (102 of FIG. 6) is partitioned among multiple server-based databases, each accessible via a network.

In yet another embodiment of the simplified network addressing system (not shown), the conversion database returns a fully formatted network access command which includes the URL2 122, e.g. <http://URL2/>.

Improving Speed: Maintaining a Local Cache

Figure 7:
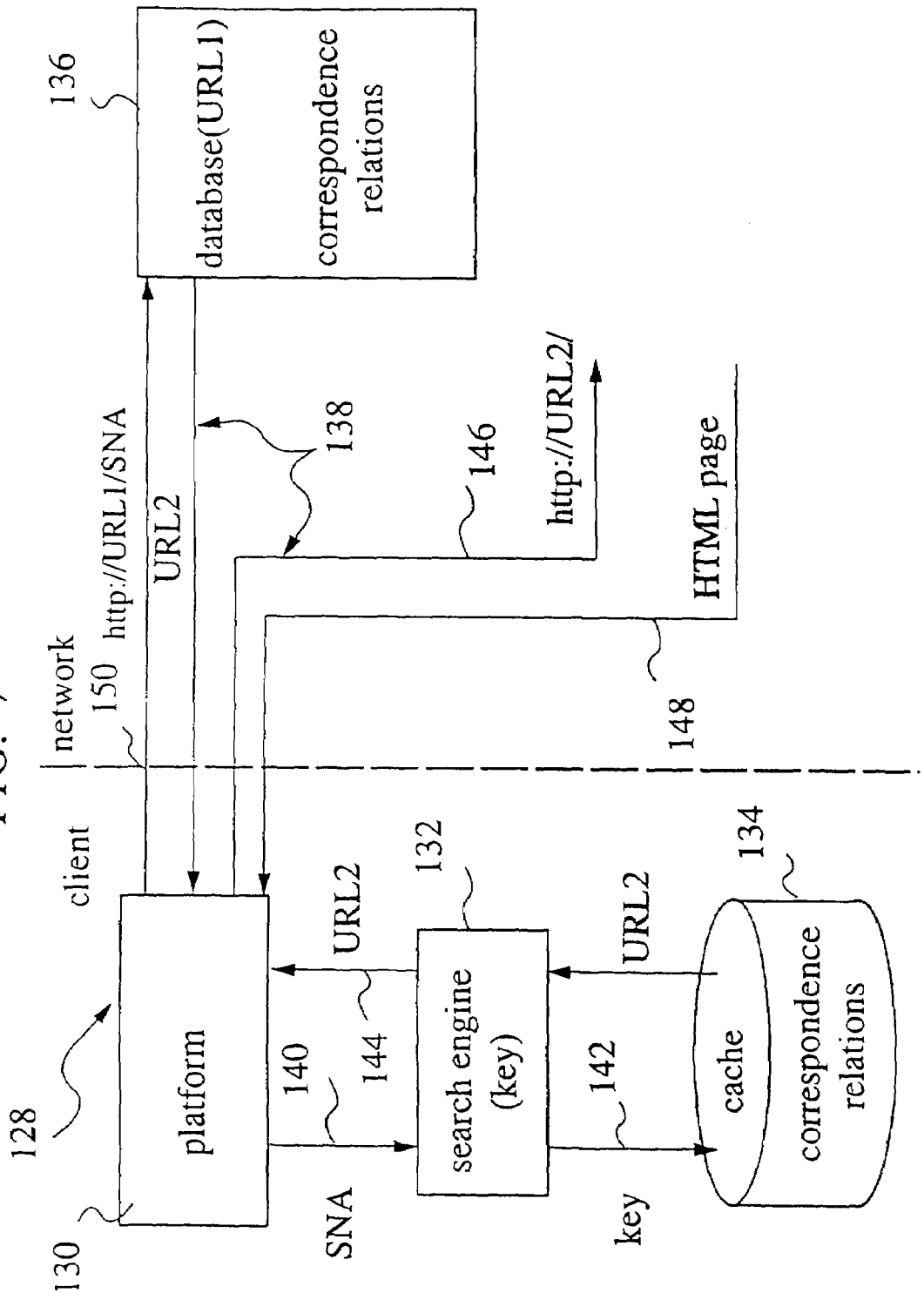
FIG. 7 is a block diagram of an alternative embodiment of a FIG. 1 system in which part of a database is maintained in the local system while another part is located on a network as in FIG. 6.

FIG. 7 is a block diagram which illustrates a conversion database partitioned between a first part that is retained within the client and a second part that is accessible via a network connection. FIG. 7 includes a client, designated generally by the numeral 128, a platform 130, a client search engine 132, and a client cache 134 for storing selected correspondence relations. FIG. 7 also includes a network accessible conversion database 136 and network connections between the client 128, the conversion database 136 and other network resources (not shown). These network connections are designated generally by the numeral 138.

One embodiment of the invention defines a method for operating a simplified network addressing system which uses the elements illustrated in FIG. 7. When a simplified network address is input to the client 128 for a network accessible resource, the simplified network address 140 is first passed to the client search engine 132 which uses the simplified network address as a search key 142 for searching the selected correspondence relations located on the client cache 134. If a correspondence relation matching the key 142 is located on the cache 134, the client search engine returns a corresponding URL 144, which in the present example we assume is URL2. Having found a corresponding URL within the client cache 134, the client 128 uses the URL2 to form a network access command 146<http://URL2/> which is addressed to a network resource having a copy of a network file corresponding to the simplified network address input by the user. The addressed network resource (not shown) returns the desired network file, in this example a HTML page 148.

When the correspondence relation matching the simplified network address 140 is not found within the client cache 134, the client uses the simplified network address to form a network access command 150 addressed to the network accessible conversion database 136. A search of the database 136 for a matching correspondence relation occurs as described above with respect to FIG. 6. If the search is successful, the conversion database 136 returns the URL2 to the client via the network connections 138 and the client 128 uses the returned URL2 to form the network access command 146, as described above.

The embodiment illustrated in FIG. 7 has several advantages over the simpler embodiment illustrated in FIG. 6. The first advantage is speed of operation: when the URL corresponding to the simplified network address is found within the client's local cache 134, the access command 146 can be issued without waiting for the remote conversion database 136 to respond. A second advantage is apparent when the network is unstable or unreliable, such as when long response delays are typical or network connections are routinely lost, as is often the case currently for the Internet and its World Wide Web. Under such unreliable conditions, if the needed URL is found in the local cache 134, the access command 146 can be rapidly formed.

In an alternative embodiment of the simplified network addressing system, the network accessible conversion database 136 of FIG. 7 is partitioned between multiple network accessible databases.

In another specific embodiment of the simplified network addressing system (not shown), the local cache 134 and the remote database 136 return fully formatted network access commands as previously described.

Use of Windows

Figure 8:
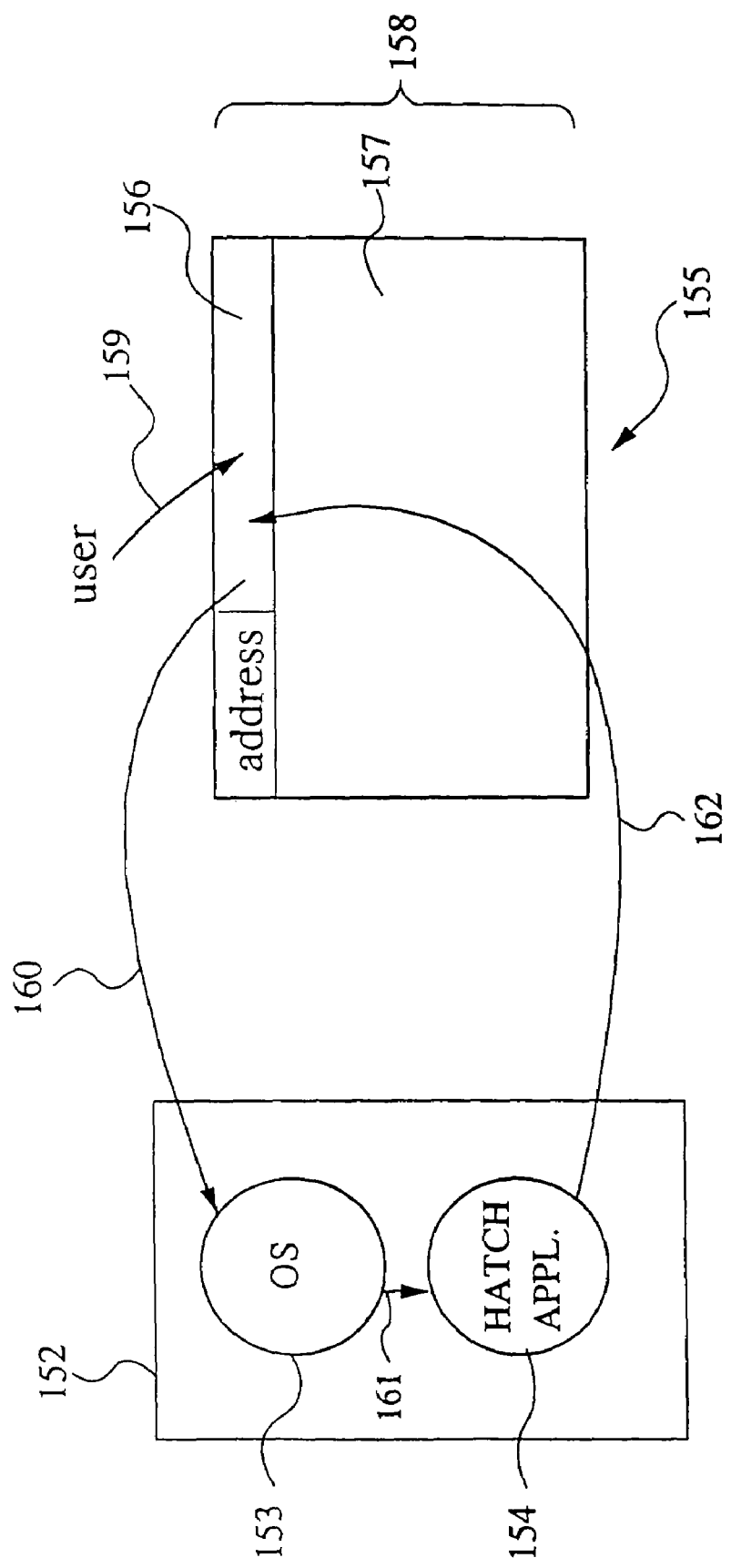
FIG. 8 is a schematic diagram illustrating a display of information in a FIG. 1 system using a windowed operating system.

FIGS. 1 and 5 illustrate systems according to several aspects of the present invention which provide a display (16 of FIG. 1) for displaying the accessed network information. In a specific embodiment of the invention, the client platform (12 of FIG. 1) includes an operating system which provides windowed displays, commonly referred to as windows. Such windows may occupy some portion of the display (16 of FIG. 1), and several windows may be displayed concurrently, each window containing different information. FIG. 8 is a schematic diagram illustrating a windowed system. FIG. 8 includes a client platform 152 having an operating system 153 providing a windowed environment, and has a simplified network application ("HATCH APPLICATION") 154. The specific environment also includes a network browser application designated generally by numeral 155 and having an address window 156 and a network window 157, sized and positioned such that they just fill the screen of a display forming a composite window 158.

A specific embodiment of the invention defines a method which first displays a user input 159 (FIG. 8) simplified network address in the address window 156. The user input simplified network address is monitored 160 by the operating system 153 which passes 161 the simplified network address to the HATCH APPLICATION 154. The HATCH APPLICATION 154 determines that the user input represents a simplified network address, then forms a conversion request command including a copy of the simplified network address, as previously described, sends the formed command to a conversion database (120 of FIG. 6) and eventually obtains from the database a fully formatted network access command, e.g. <http://URL2/> (146 of FIG. 7), for retrieving the desired network information. The browser application 155 continues to display the user input simplified network address in the address window 156 during the conversion. When the network access command is available, the HATCH APPLICATION 154 replaces 162 the previously displayed simplified network address with the formed network access command (e.g., <http://URL2/>) in the address window 156. The browser application 155 then uses the network access command to access the desired network information. When the accessed network information (148 of FIG. 7) is available, it is displayed in the network window 157.

A Variety of Input and Pointing Devices

Figure 9:
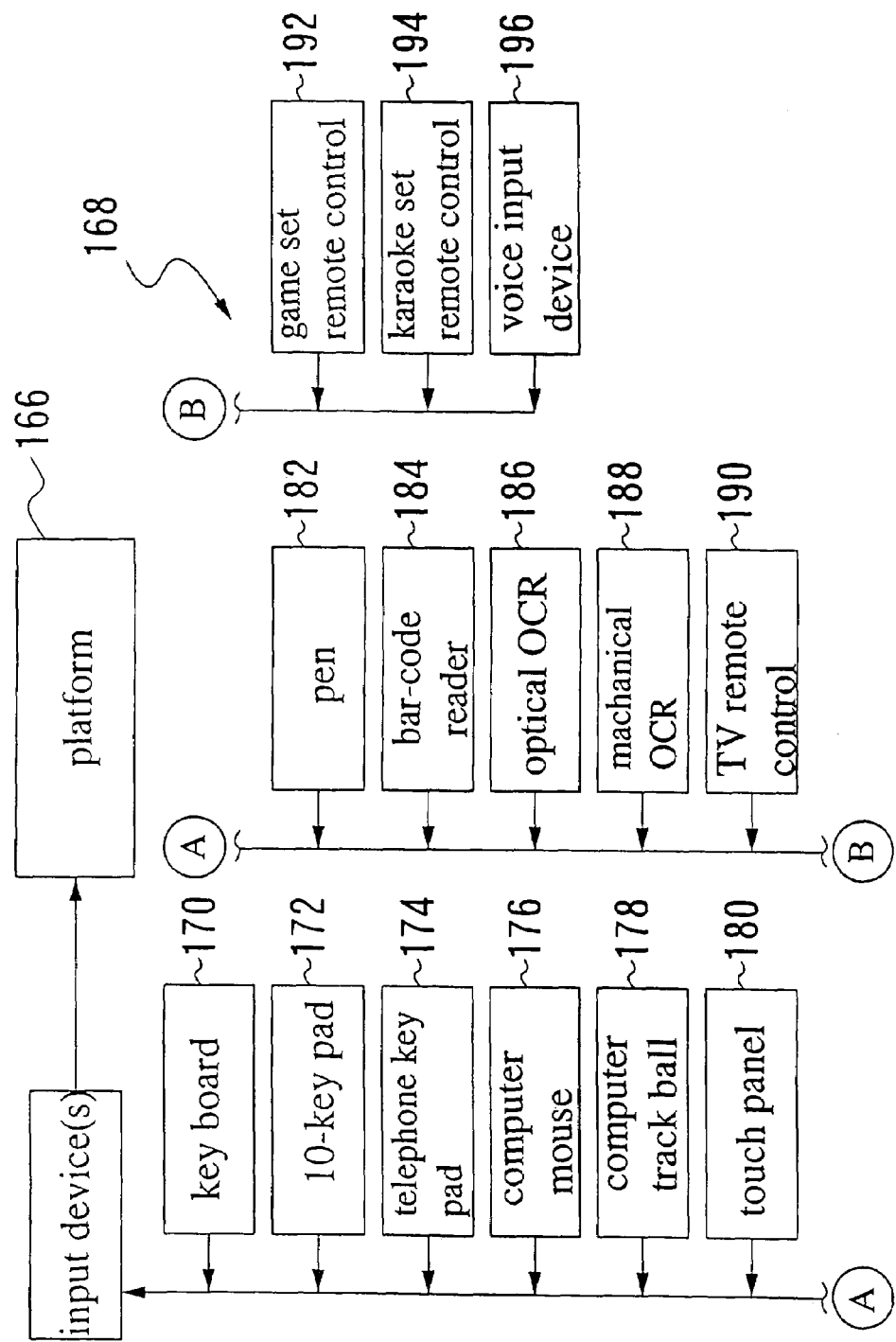
FIG. 9 is a block diagram illustrating a variety of input and pointing devices used with a system as in FIG. 1.

Various input and pointing devices are usable for inputting a simplified network address. Some, such as a keyboard, can operate alone. Others, such as a pointing device or a TV remote controller, must cooperate for inputting a simplified network address. FIG. 9 is a block diagram illustrating a client platform 166 and a variety of input devices, designated generally by the numeral 168. These devices include, but are not limited to, any one or more of the following: a standard keyboard 170, a 10-key pad 172, a telephone key pad 174, a computer mouse 176, a computer trackball 178, a touch panel 180, a pen pointing device 182, a bar-code reader 184, an OCR 186 which optically reads a medium containing, in an encoded form, the simplified network address, an OCR 188 which mechanically reads a medium containing, in an encoded form, the simplified network address, a TV remote control attached to a TV set 190, a remote control attached to a game set 192, a remote control attached to a Karaoke set 194, and a voice input device 196 for accepting the simplified network address in spoken form.

Figure 10:
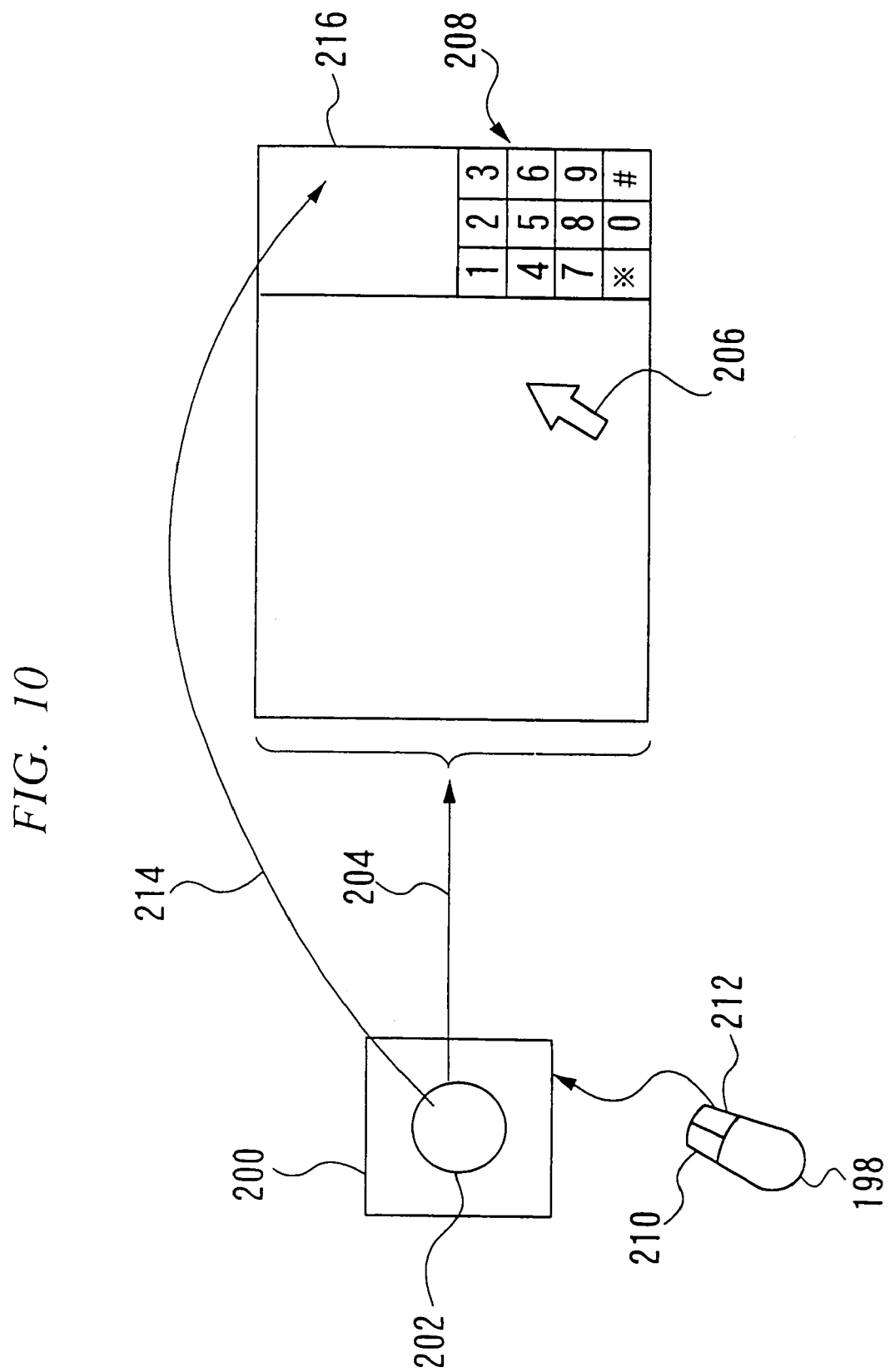
FIG. 10 is a schematic diagram showing a cooperation between a pointing device and a displayed keypad for inputting a simplified network address.

Several of the input and pointing devices mentioned here normally operate in conjunction with a display device (16 of FIG. 1) for inputting a simplified network address. FIG. 10 is a schematic diagram illustrating an example of cooperation between a pointing device, an operating system, and a windowed display of symbols from which a simplified network address is to be constructed.

FIG. 10 includes a computer mouse 198, a client platform 200, an operating system 202, a displayed composite window 204, a displayed cursor 206, and a displayed telephone keypad, designated generally by the numeral 208. Movement of the mouse 198 relative to a surface produces a corresponding movement of the displayed cursor 206 within the displayed composite window 204. The illustrated mouse includes left and right buttons, 210 and 212, respectively, used for selecting, activating and moving a displayed object. In this example, an operator uses the mouse 198 to position the cursor 206 over one of the numbers of the displayed telephone key pad 208. The operator then depresses and releases the left mouse button 210 once to select the number over which he has positioned the cursor 206. The operating system 202 determines which number corresponds with the cursor location and displays that number 214 in a simplified network address display window 216 located above the displayed telephone key pad 208. The process continues, one digit at a time, until a complete simplified network address has been entered into the display window 216. The simplified network address is then converted to a corresponding URL as has been described previously, above.

A person having an ordinary level of skill in the art to which this invention pertains will appreciate that a single button mouse, a three button mouse, or other equivalent computer pointing device may be substituted for the two button mouse in the above example without materially altering the scope of the invention. The example is intended to illustrate features of the invention in a practical manner and is not intended to limit the scope of the invention.

Message Aliasing

Figure 11:
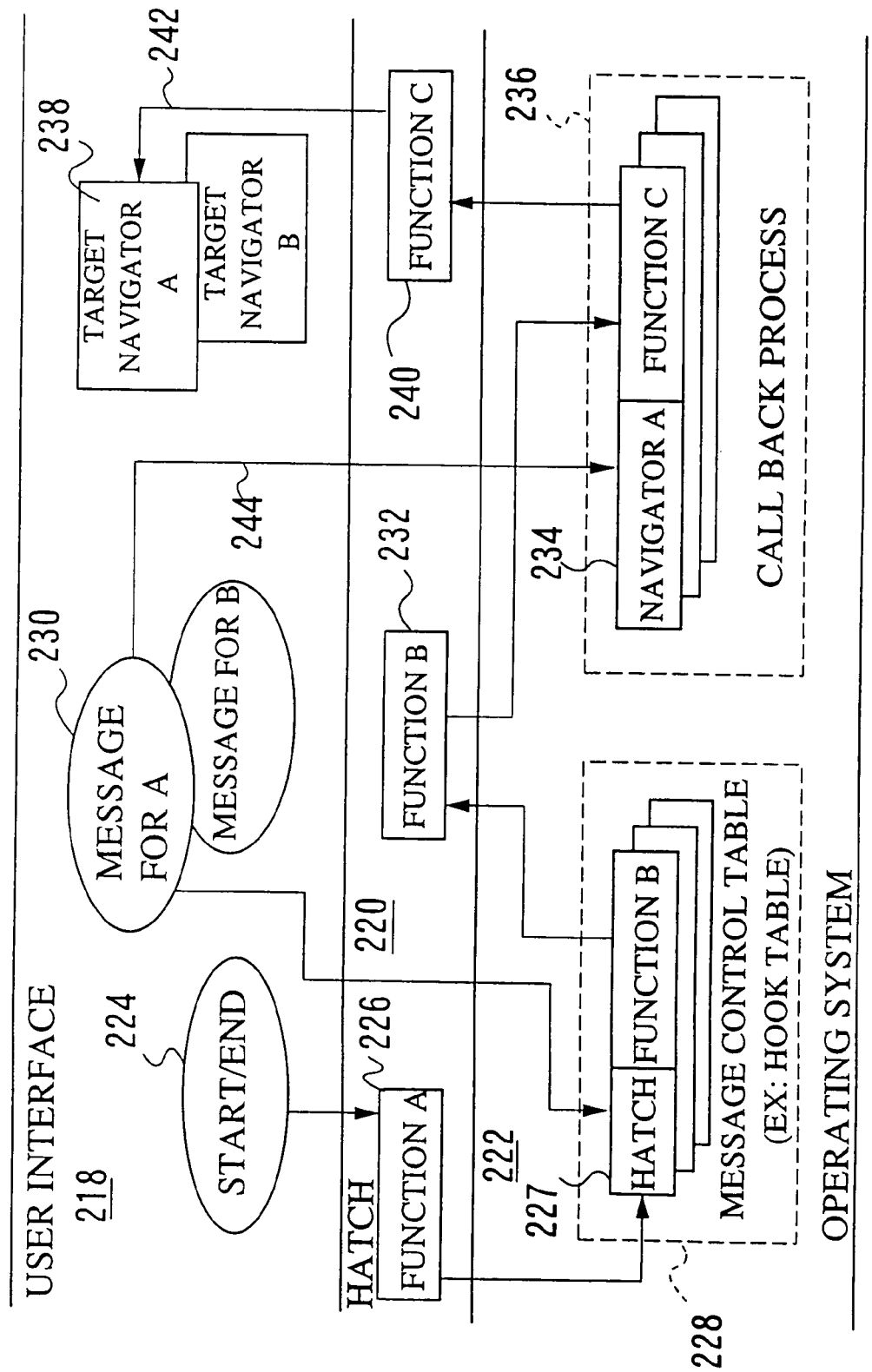
FIG. 11 is a schematic diagram illustrating the use of message aliasing in a message passing operating system according to one aspect of the invention.

The next group of embodiments of the invention are defined in an operating system environment which provides objects having procedures, storage, and using message passing for invoking procedures, i.e., an environment using an object oriented programming style. There are a number of well known operating systems of this type. FIG. 11 is a schematic diagram illustrating interactions between a user interface 218, an application program referred to as a Hatch application 220 which includes Functions A, B and C and a message passing operating system 222.

These embodiments add functionality to existing applications, such as Internet browsers, by monitoring messages to applications. As one practical example, the Hatch application 220 allows it to implement services which are not implemented by the browser application, by monitoring messages to the browser's location (address) field.

FIG. 11 illustrates a process in which <simplified network address>, input as a user message at the user interface 218, is intercepted by the operating system 222, and an alias message, e.g., <URL1/simplified network address/> is substituted in place of the simplified network address. It will be recalled that URL1 is the network address of the conversion database 102 in the description related to FIG. 6, above. FIG. 11 is a schematic representation of a process, internal to the client, used to create an alias message. In message passing operating systems, this message aliasing process uses a simplified network address to form a portion of a network access command to a network accessible conversion database (102 of FIG. 6). The message aliasing process itself is an embodiment of one aspect of the invention. In an alternate embodiment of the message aliasing system, the alias message forms a fully formatted conversion request command, e.g. <http://URL1/simplified network address/>, as described previously herein.

The message aliasing process illustrated in FIG. 11 is initiated by the user inputting a message 224 to start the Hatch application 220. The start message 224 is forwarded to the Hatch application 220 and creates an object, Function A 226. Function A, in turn, creates an entry 227 in an operating system Message Control Table 228. An example of a message control table is the Hook Table defined in the Microsoft Windows® (a registered trademark of Microsoft Corporation) 95 and Windows® NT operating systems. At this point, the message aliasing process pauses, waiting for the user to send another message.

A user input message 230 in the form of a simplified network address is forwarded to the Hatch application 220 which forwards the message to the operating system 222. There, the message is forwarded via the Message Control Table entry 227 back to the Hatch application where it invokes a Function B 232. The purpose of the Function B is to create a new entry 234 in an operating system Call Back Process 236. A person skilled in the art will recognize the Call Back Process 236 as a typical operating system solution for forwarding operating system level messages within the system. The message 230 is intended ultimately for a network browser, referred to here as target Navigator A 238.

The user intends the<simplified network address> message to go to target Navigator A 238, but target Navigator A does not recognize the <simplified network address> in its present form. Function B 232 forms a new entry 234 in the Call Back Process 236 the first time the user sends a message to a new recipient. Thus when the user sent the message <simplified network address> 230 to the target Navigator A 238, having not previously sent a message to target Navigator A, the Function B 232 removes target Navigator A's original callback function from the Call Back Process 236, saves the original callback function, and replaces the original callback function with a shadow callback function 234. The shadow callback function 234 is used to forward the <simplified network address> 230 to a Function C 240 in the Hatch application 220. Function C converts the <simplified network address> 230 into an alias message 242, e.g., <http://URL1/simplified network address/>, which is acceptable to the target Navigator A 238, and forwards the alias message 242 to the intended target Navigator A 238.

Function B 232 and the Message Control Table entry 227 cooperate to define a two-state machine which keeps track of a first time any <simplified network address> is sent to an intended target. In a first of the two states, an <simplified network address> 230 which is intended for the target Navigator A 238 results in the creation of the shadow callback function 234 and the conversion of the <simplified network address> to the alias Navigator-acceptable form <http://URL1/simplified network address/>. After creating the shadow callback function, the state machine is advanced to the second state, where it remains until the Hatch application 220 is turned off. While in the second state, subsequent <simplified network address> messages 244 directed to the same target Navigator A 238, are sent directly by the shadow callback function 234 to the Hatch application Function C 240. The Function C converts the <simplified network address> to the alias acceptable form <http://URL1/simplified network address/> and forwards this alias message 242 to the intended recipient 238.

When the user inputs a message to turn off the Hatch application, the shadow callback functions 234 are replaced by the previously saved browser application original callback functions, and a previous operating system behavior is resumed.

Message Aliasing for Simplified Network Addressing

Figure 12:
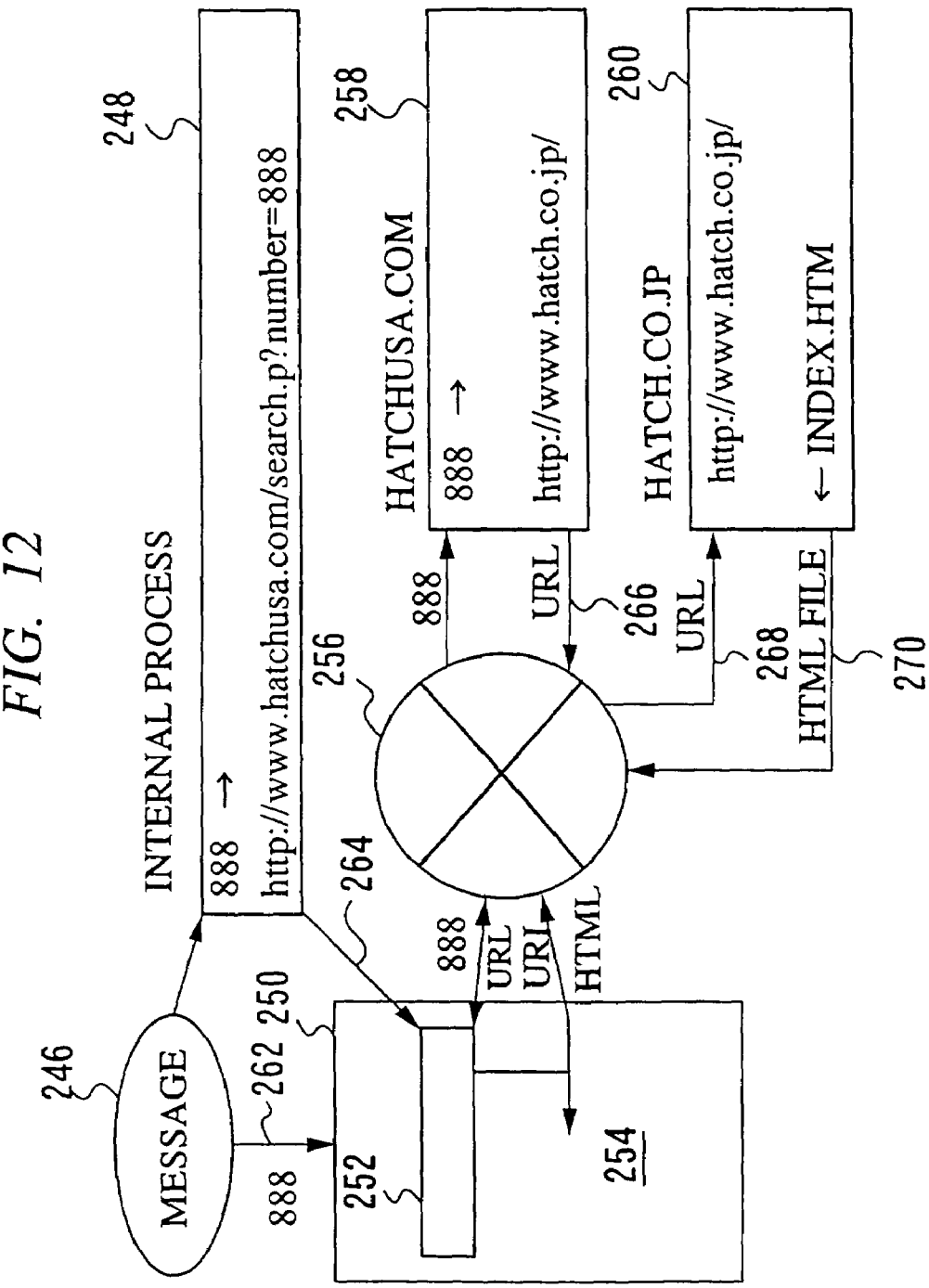
FIG. 12 is a schematic diagram illustrating the use of message aliasing to implement simplified network addressing.

FIG. 12 is a schematic diagram illustrating the use of the message aliasing process described above to implement a specific embodiment of a simplified network addressing of network accessible information. FIG. 12 includes a user <simplified network address> message 246, an internal message aliasing process 248, a display monitor 250, an address window 252, a network window 254, a network connection 256, a network accessible conversion database 258, and a network accessible information resource 260. The user inputs the simplified network address <888> 262 which is converted by the specific message aliasing process 248 to <http://www.hatchusa.com/search. p?number=888/> 264. This network access command is a request to the HatchUSA server which is a specific example of a server implementing a conversion database 258. The database 258 is asked to return a URL 266 which corresponds to the simplified network address <888>. The HatchUSA server 258 returns a fully formatted network access command </www.hatch-.co.jp/> as the URL 266 corresponding to <888>. The network access command 268 is sent via the network 256 to the Hatch.Co.JP server 260. The Hatch.Co.JP server 260 returns its HTML homepage 270 for display in the network window 254 of the user's display monitor 250.

Message Aliasing for Network Server Commanding

Existing Internet browsers implement a limited number of Internet protocols such as mail <mailto://>, FTP <ftp://>, and news <news://>. A service program monitoring user input can recognize and implement a whole set of newly defined protocols or commands not implemented by a browser. One such example is direct access to Internet search engines from the browser's location field. For example, if the user enter the string <yahoo://hatch/> an existing browser will attempt to connect to the URL <http://yahoo://hatch/>, which will result in an error since <http://yahoo://hatch/> is not a valid URL. A service program monitoring user input can recognize the string <yahoo://hatch/> as a request to search for the string <hatch> in the YAHOO!® search engine, and as a result will send the following URL to the browser: <http://search.yahoo.co.jp/bin/search?p=hatch>. This URL causes the browser to contact the search engine at <search.yahoo.co.jp> and to initiate a search for the keyword <hatch>. The search engine will return the results of the search back to the browser. With this introduction providing a frame of reference, a detailed description of a specific embodiment is provided as follows.

Figure 13:
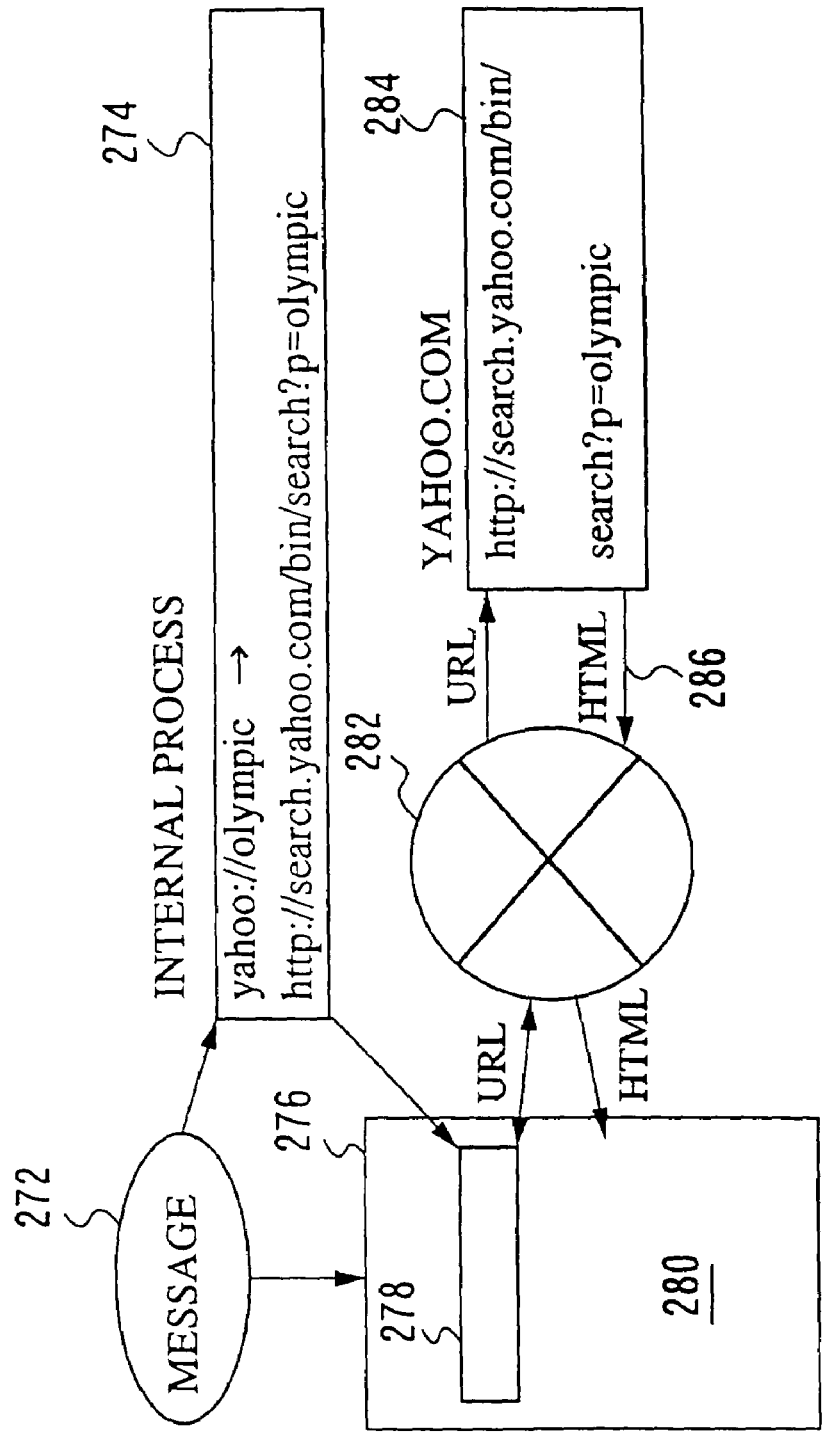
FIG. 13 is a schematic diagram illustrating the use of message aliasing to implement a network server command process according to another aspect of the invention.

A related embodiment of the invention is shown in FIG. 13 which is a schematic diagram illustrating the use of the message aliasing process to simplify the commanding of a remote server. In the specific example illustrated in FIG. 13, the user inputs a simplified network address <yahoo://olympic> and the YAHOO!® Internet search database returns the results of a search on the keyword <Olympic>. Since YAHOO!® does not recognize the string <yahoo://olympic>, the message aliasing process is used to construct a network access command that is recognized. The user input string <yahoo://olympic> includes a command portion <yahoo://> and a parameters portion <olympic>.

FIG. 13 includes a user input message 272, an internal message aliasing process 274, a user display monitor 276, a displayed address window 278, a displayed Internet window 280, a network connection 282, and the YAHOO!® database server 284. The user input message 272 is the string <yahoo://olympic>. This string is converted by the process 274 to an alias message string <http://search.yahoo.com/bin/search?p=olympic/>. Referring to the description above relating to FIG. 11, it is the Hatch application Function C 240 that creates the alias string from the user input string. The user input string <yahoo://olympic> is displayed in the address window 278. It is replaced by the longer alias message string. The alias message string is properly formatted to command the YAHOO!® database to return the results of a search on the keyword <olympic>. The properly formatted network access command is sent to the YAHOO!® database 284 via the network connection 282. The database server 284 returns the result of its search of the YAHOO!® database as an HTML encoded document 286. The encoded document is displayed in the network window 280, completing the simplified server commanding process.

There are an increasing number of network servers capable of responding to predefined commands such as the <http://URL/ . . . /search?p=parameters /> command defined for the YAHOO!® system. Presently only the <http://URL/ . . . />, <mailto:// email address/>, <ftp:// . . . /> and <news:// newsgroup address /> are defined. As new server commands are defined, the message aliasing process defined above can readily be adapted to create and substitute a properly formatted alias message for the user input simplified command. For example, the Hatch application can be customized to support a variety of search engines such as: <altavista:// . . . />, <infoseek:// . . . />, <yahoo:// . . . />, etc (ALTAVISTA® is a registered service mark of Digital Equipment Corporation).

Correspondence Relation Table as a Searchable Database

The embodiments above have been described primarily from the viewpoint of the user who inputs a simplified network address or server command and eventually receives a desired Web page. The focus now shifts to embodiments representing the network accessible database which stores correspondence relations used to convert a simplified network address to a specific URL. The database itself becomes an embodiment of the invention. Previous examples of the present focus are the network based conversion database 102 of FIG. 6, the network accessible conversion database 136 of FIG. 7, and the network accessible conversion database 258 of FIG. 12. The database 102 illustrated in FIG. 6 will provide the necessary background for the discussion which follows.

The first embodiment is a server-based, network-searchable database system, designated generally by the numeral 102 of FIG. 6. The database 102 includes a server 106 providing a communication connection to a network. The server 106 receives a search request 112 via the communications connection, and the received search request includes a simplified network address: <http://URL1/simplified network address/>. The storage 110 includes a correspondence relation table defining a correspondence relation between a network Uniform Resource Locator and a simplified network address. The database also includes a search engine 108 which uses a received simplified network address 114 as a search key 118 to search the stored correspondence relations 110 for a correspondence relation matching the received simplified network address. If the search engine 108 finds a matching correspondence relation, it returns a corresponding URL 118, 120 to the server 106. The server, in turn, returns the corresponding URL 122 to the requester, in FIG. 6, a client 100. The database 102 defines an embodiment of the invention.

In a practical sense, the server-based, network-searchable database system of FIG. 6 does not exist in isolation of the network nor the client systems 100 which use the database to convert simplified network addresses to URLs. Thus in a specific embodiment the database system includes a client system which originates search requests 112 via the network and which receives the accessed network information 126 via the network.

Number Registration

Figure 14:
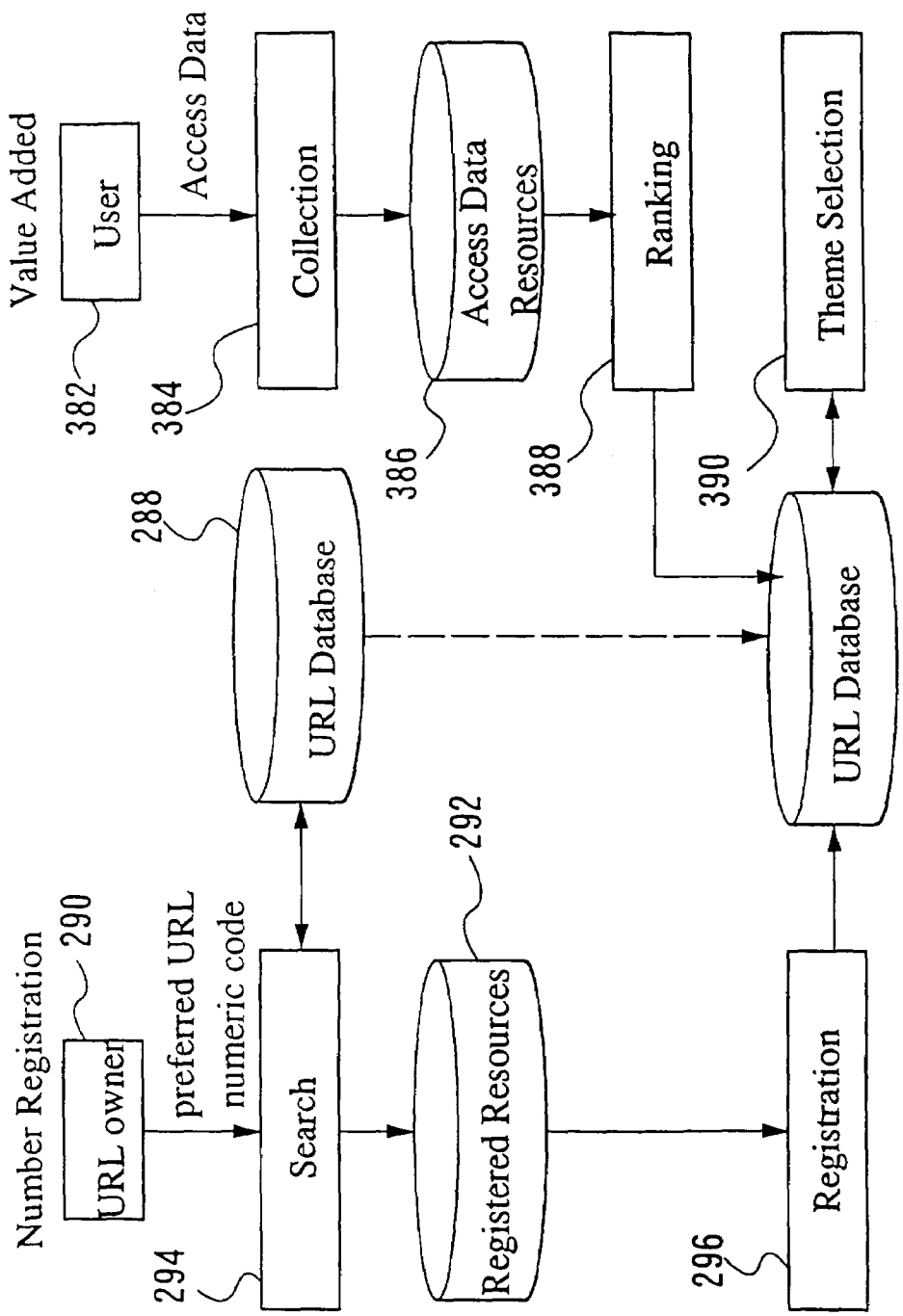
FIG. 14 is a schematic diagram illustrating several processes relating to the creation, the updating and the maintenance of a server-based, network searchable database of stored correspondence relations.

FIG. 14 is a schematic diagram illustrating several processes relating to the creation, the updating and the maintenance of a server-based, network searchable database of stored correspondence relations. The processes illustrated in FIG. 14 include a URL database 288 (upper and lower representations connected via a broken line), a URL registration process 290, stored registered resources 292, a search engine 294, and a correspondence relation registration process 296. The elements 288–296 define a server-based, network searchable database of stored correspondence relations. The database is updatable via inputs from the URL owner.

In a specific embodiment, such as the URL registration process 290 of FIG. 14, a URL owner enters a simplified network address such as a URL numeric code. The URL numeric code is passed to the search engine 294 and is used as a search key of the registration process 290. The search engine 294 is used to examine the previously registered URL numeric codes in the database 288 to determine whether the received URL numeric code has already been used. If it has not been previously registered, the received URL numeric code is registered temporarily as a registered resource 292. The new correspondence relation between the URL and the URL numeric code is then submitted to the registration process 296 which enters the new correspondence relation into the URL database 288. The URL database 288 corresponds with the stored correspondence relations 110 of FIG. 6. If it is determined that the URL numeric code has been previously registered, the URL owner starts the registration process 290 with a new URL numeric code.

A URL owner can register a preferred simplified network address, such as a URL numeric code, which can be selected on the basis of, for example, a telephone number, a birth date, a vehicle number, a house number, a room number and the like. In a specific embodiment, a URL owner selects a sequence of musical tones from a predetermined set of tones for defining a simplified network address in terms of musical tones. The system includes an element for converting the sequence and a corresponding URL into a simplified network address. The database uses the simplified network address to form a new correspondence relation in which the simplified network address was initially specified in terms of the sequence of musical tones. These numbers are generally assigned on a "first come, first served" basis.

Letter and Number Sequences as Simplified Network Addresses

Figure 15:
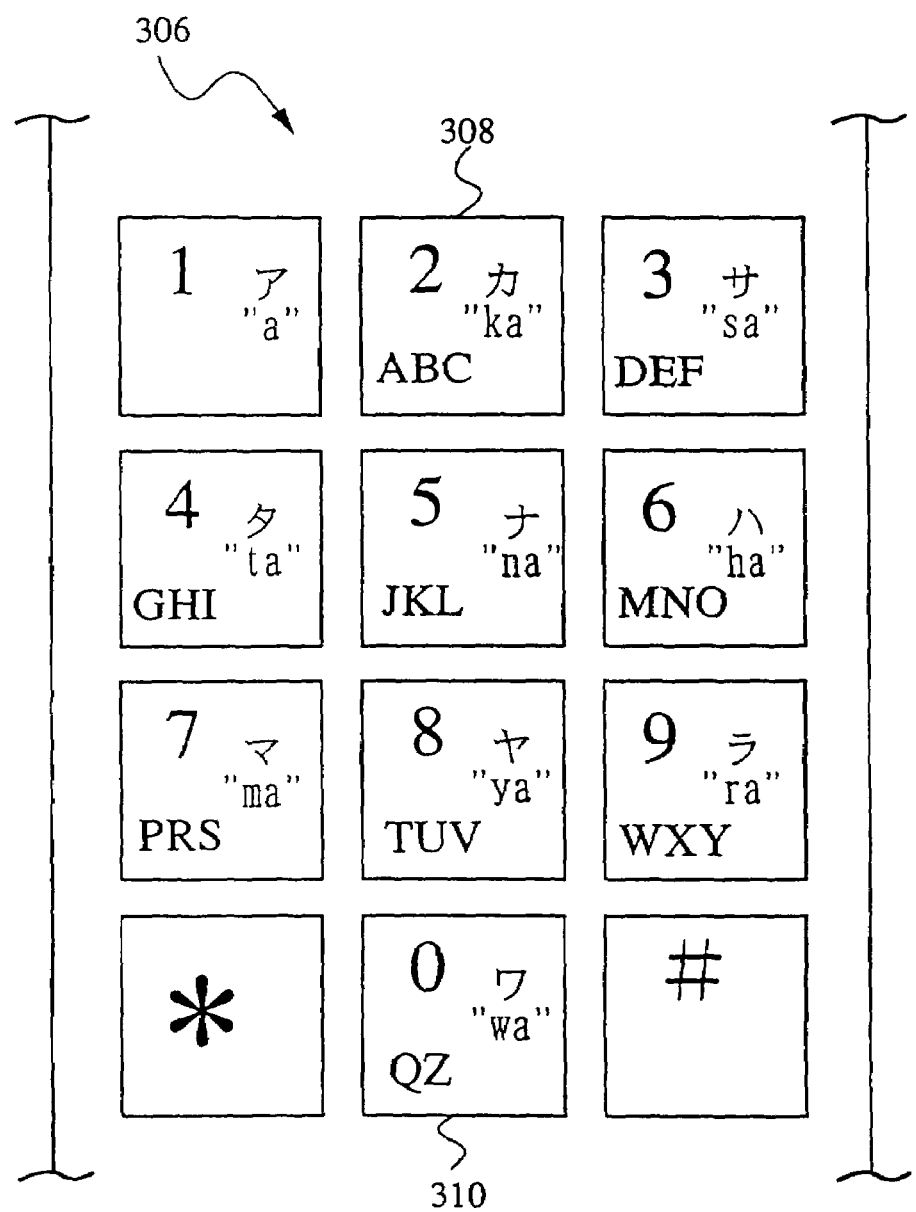
FIG. 15 is a pictorial diagram illustrating a telephone key pad, and alternatively illustrates a 10-key pad, used to input a simplified network address in a specific embodiment of the invention.

FIG. 15 is a pictorial diagram illustrating a telephone key pad, and alternatively illustrates a 10-key pad, used to input a simplified network address in a specific embodiment of the invention. The key pad is designated generally by the numeral 306. The key pad 306 includes keys having numbers and associated letters of an alphabet. The key bearing the number 2 also bears the letters A, B and C, and is designated by the numeral 308. The key bearing the number 0 also bears the letters Q and Z, and is designated by the numeral 310.

FIGS. 16 through 20 relate to a group of processes for converting letter and number sequences into simplified network addresses such as URL numeric codes for use in defining correspondence relations.

Figure 16:
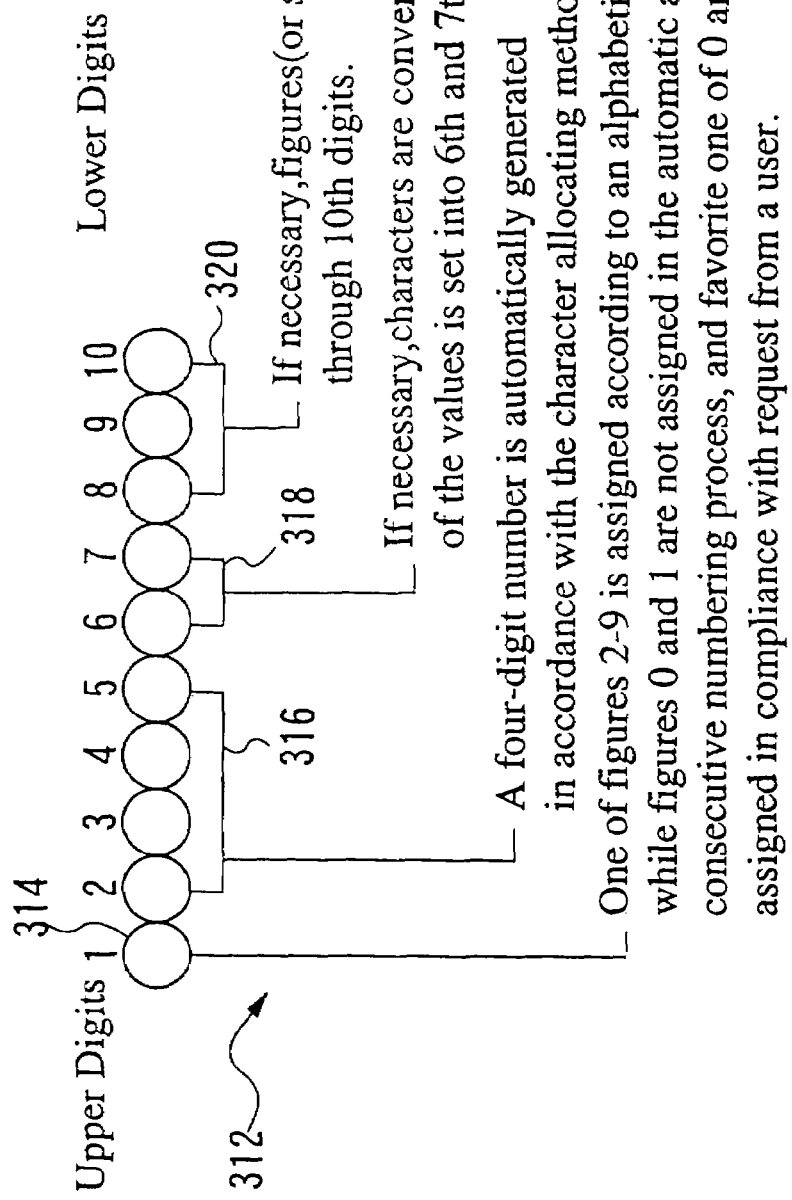
FIG. 16 is a pictorial diagram which illustrates a typical format for a 10-digit URL numeric code.

FIG. 16 is a pictorial diagram which illustrates a typical format for a 10-digit URL numeric code (assigned number). The URL numeric code is designated generally by the numeral 312 and includes an upper digit 314, a four-digit number 316, a two-digit number 318, and a three digit number 320. The URL numeric code is a concatenation of the numbers 314 and 316, while numbers 318 and 320 are optional components of this code.

FIG. 17 is a table defining a correspondence between alphabetic letters and Reference Numbers in a range from <1> through <9>. The table is designated generally by the numeral 322. The letters are arranged in groups, one letter group per row, down a leftmost column of the table 322.

FIG. 18 is another table defining a correspondence between groups of alphabetic letters and Rules of Assignment. The table is designated generally by the numeral 334. The letter groups are arranged along a leftmost column of the table 334. The specific letter groups along the leftmost columns of the two tables 322 and 334 are not identical.

Figure 19:
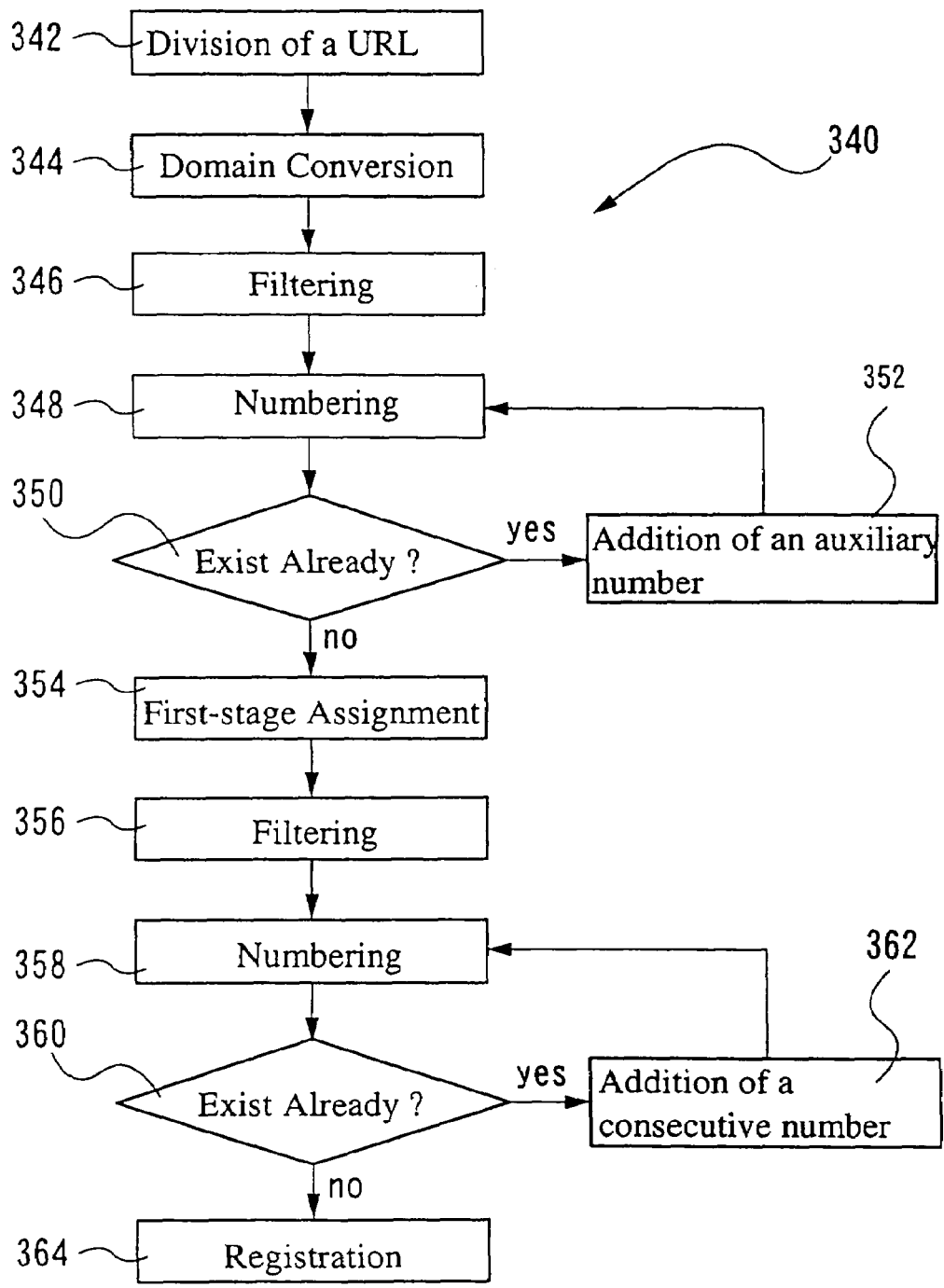
FIG. 19 is a flowchart illustrating a process for creating a URL numeric code according to a specific embodiment of the invention.

FIG. 19 is a flowchart illustrating a process for creating a URL numeric code according to a specific embodiment of the invention. The process is designated generally by the numeral 340.

Figure 20:
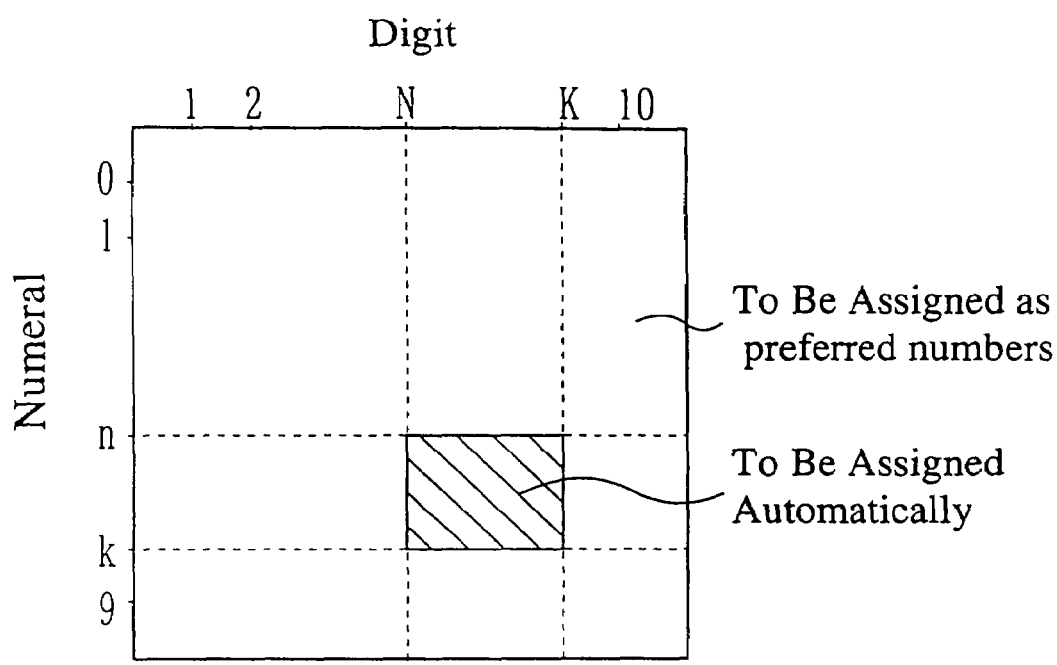
FIG. 20 is a graph illustrating an aspect of another process for creating a URL numeric code according to another specific embodiment of the invention.

FIG. 20 is a graph illustrating an aspect of another process for creating a URL numeric code according to another specific embodiment of the invention.

A specific embodiment of a URL numeric code includes a number of digits, for example ten digits. The digits are grouped as shown in FIG. 16, according to their function in the URL numeric code. The first (upper) digit 314 can be assigned either through a process of utilizing the first letter of the URL name, or by selecting alternatively the number <0> or the number <1>. A first derivative number is obtained using the first letter of the URL name in combination with a reference number, as shown in FIG. 17. For example, the name <ntt> has a first letter <n>. In FIG. 17, the letter <n> is found in the row <mno> 324. Next, the appropriate Reference Number (FIG. 17) is selected. Since <n> is the first letter of the name, the appropriate Reference Number is <1>. As a result of <n> being in row <mno> and column 1, the first derivative number <6> is obtained (see 326 in FIG. 17). Therefore, the first digit of the URL numeric code is <6>. Alternatively, the URL provider can chose a first digit from the numbers <0> and <1> instead of the first derivative number which results from the above exemplified use of FIG. 17.

The method of assigning the second through fifth digit (316 of FIG. 16) utilizes FIGS. 17 and 18 as follows. A four digit number is obtained by using the first derivative numbers obtained through the use of FIG. 17 and converting these first derivative numbers through Rule Assignments in FIG. 18 into second derivative numbers. For example, a URL name <ntt> is processed using FIG. 17. The first letter <n> has a first derivative number <6> as described above. The second letter <t> is found in row <tuv> 328 and is combined with Reference Number <2> (330 of FIG. 17), resulting in a first derivative number <7> (332 of FIG. 17). Similarly, the third letter <t> in row <tuv> is combined with a Reference Number <3>, resulting in first derivative number <6>.

Next, the first derivative numbers thus obtained are converted to second derivative numbers through Rule Assignments in FIG. 18 as follows. The first derivative number of each letter is placed in the row corresponding to this letter, thereby showing whether the first derivative number corresponds to the second, third, fourth or fifth digit. The first derivative numbers in each row (FIG. 18) are added. If the addition results in a two digit number, the first digit is canceled.

Returning to the <ntt> example, first derivative number <6> (for <n>) is placed in the <ncjfrlx> row (336 of FIG. 18) indicating that this is the third digit. First derivative numbers <7> and <6> (for <t>) are placed in the <tkpgwz> row (338 of FIG. 18) indicating that these represent the fourth digit. The addition of first derivative numbers <6> and <7> in this row results in a total of <13>. The cancellation of the first digit <1> of the total of <13> provides a <3> for the fourth digit. There are no alphabetical letters corresponding to the second and fifth digit of FIG. 18, consequently the second and fifth digit are each assigned the number <0>. The second through fifth digits of the URL numeric code 312 (FIG. 16) are thus <0630> when using the name <ntt>. The numbers resulting from the Assignment Rules of FIG. 18 are referred to as the second derivative numbers. Thus the second derivative numbers of the second, third, fourth and fifth digits are <0>, <6>, <3> and <0> respectively.

In a specific embodiment, numbers are assigned to the sixth and seventh digit to make the URL numeric code unique. This step is accomplished by summing the individual digits of the first derivative number and assigning the sum to the sixth and seventh digits. Thus, in the case of a URL name <ntt> the first derivative numbers are <6>, <7> and <6> when using FIG. 17 as described above. The sum of these three digits is <19>, in which case the sixth and seventh digit are assigned a <1> and a <9> respectively. In another specific embodiment, random digits are selected for the eighth, ninth and tenth digits; if it is determined that the seven digit URL numeric code already exists.

The above processes are utilized in assigning a URL numeric code to a corresponding URL having a typical character string which includes the transmission protocol <http://> followed by a domain name, a subdomain name and a directory. This process is illustrated in the flowchart of FIG. 19. The URL character string is divided into a subdomain name, a domain name and a directory as shown in step 342 of FIG. 19. The domain conversion is then started in step 344. A filtering procedure (step 346) is performed wherein information such as codes of classification, country name, name of the information service, symbols, etc. are removed.

In step 348 second derivative numbers are assigned to the second through fifth digit according to the above described methods for calculating a second derivative number. Additionally, the numbers <0> or <1> can be assigned to the first digit. In step 350 (FIG. 19) a comparison is made between the number assigned in step 348 and numbers which have previously been assigned. If the is found to exist already, an auxiliary number is added (in step 352) to the five digit number by assigning numbers to the sixth and seventh digit. If the number comparison step 350 shows that the does not exist, the numbering of the domain name is completed at this point as a First-stage Assignment (Step 354).

Following First-stage Assignment, the directory string of the URL is filtered in Step 356, similar to the filtering step 346 of the domain name string. In step 358 of FIG. 19 numbers are assigned to the directory in a similar manner as described in connection with the assignment of numbers to the domain name in step 348. The number which is obtained in step 358 is compared (step 360) with existing URL numeric codes. If the number exists already, consecutive numbers are added in step 362. Finally if the number which is assigned to the sixth through tenth digit does not already exist, the URL numeric code which is thus obtained is registered in step 364 as the number corresponding to the character string of the URL.

As described above, the URL goes through a pretreatment before it is converted to a number in this numbering system. The URL is filtered and its domain name is then converted in a first-stage assignment. Subsequently, the directory part of the URL is converted thereby generating a unique number of ten digits or less.

In another specific embodiment as illustrated in FIG. 20, numbers for a URL numeric code are assigned by a combination of automatic numbering and the selection of preferred numbers. For example, the numbers for the Nth digit to the Kth digit are assigned using the nth through kth number by a method similar to the method described above with respect to FIGS. 16–19. In a specific embodiment, the automatic numbering is carried out by a public agency using a character allocating method of 10 digits and employing a computer.

Numbers are selected without the use of automatic numbering by assigning numbers which are a URL owner's preferred number (simplified network address corresponding to a specific URL). Specific examples are, a number which by analogy suggests a company, a number which is decided by secondarily-inscribed letters on an application interface, a number according to voice data mapping on an application interface, an already assigned number such as a telephone number, security papers numeric code, a zip code, a number related to a birth date or a company founding date.

A detailed example is as follows. A number suggesting a company can for example be the number <0101> as corresponding with a Japanese name <Marui-marui>, since <01> can be read as <marui> in Japanese. An example of a number which is selected by secondarily-inscribed letters on an application interface is the number <525>, corresponding with the letter string JAL which is an abbreviation of Japan Airlines Co., Inc. An example of a suitable application interface is the key pad having letters and numbers shown in FIG. 15. As an example of voice data mapping on an application interface, the numbers may be allocated to respective sounds on a music scale wherein 1=do, 2=re, 3-mi and so on. Using this technique, the number <135> is registered corresponding to the melody <do-mi-sol>. By mapping to voice, a user can also detect an input error through hearing.

Thus, by assigning a relative short number of ten or fewer digits to a URL automatically or by preference, in addition to the examples provided above, a more unique number of ten or fewer digits can be assigned to correspond to a URL.

Using a Firewall to Protect the Database

Figure 21:
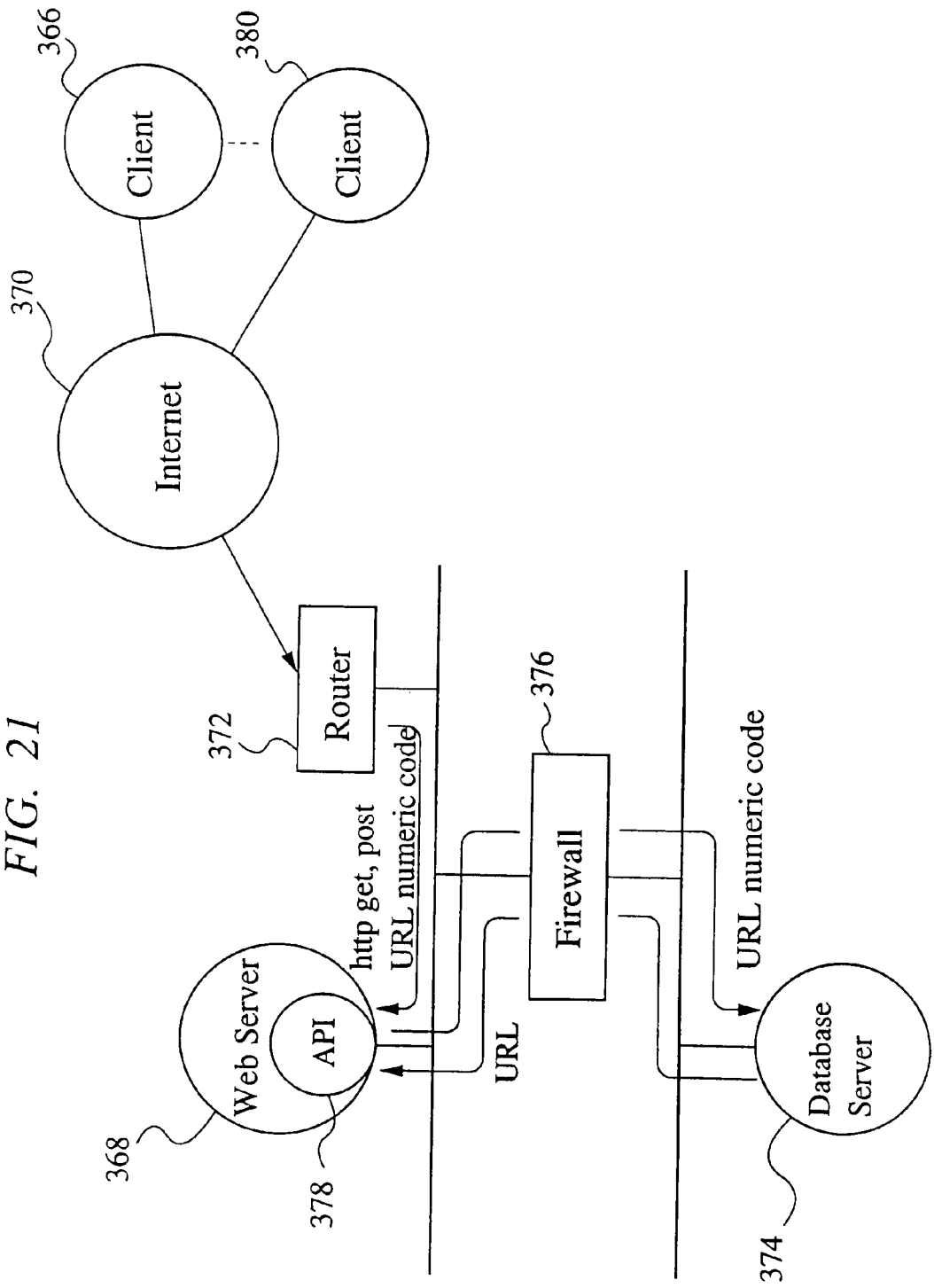
FIG. 21 is a schematic diagram which illustrates the use of a firewall to insure the integrity of a network-searchable database.

FIG. 21 is a schematic diagram which illustrates the use of a firewall to insure the integrity of a network-searchable database. FIG. 21 illustrates a network configuration wherein a client 366 communicates with a Web server 368 which is connected to the Internet 370, for example through a router 372, and also to a database server 374 through a firewall 376. The Web server 368 includes a built in API 378. This system has the capability of using a plurality of clients 366 and 380. An example of using this system is as follows. A URL numeric code is inputted by a user into the client 366. The inputted URL numeric code is sent via the Internet 370 to the Web browser 368 through the router 372 using a HTTP protocol with the designation <no=$^{xx}$> in a defined protocol <GET> method, wherein <$^{xx}$> is the URL numeric code. The Web server 368 communicates the URL numeric code to the database server 374 through the firewall 376. The firewall prevents unauthorized access to the contents of the database server.

Defining Access Data

In addition to numeric strings which are assigned to a URL, in a specific embodiment, the database saves value added information. Such information includes ranking by groups or themes. This means that information concerning the use of the URL is saved when a user accesses the Internet using a simplified network address. Thus, both the URL owner and the user can obtain valuable information. Specific examples of value added information are:

(1) the number of times a specific search requester has accessed the database;

(2) the number of times a specific search requester has submitted a specific registered simplified network address;

(3) the total number of search requests received for each registered simplified network address; and (4) the total number of search requests received by the database.

Referring to FIG. 14, each time a USER accesses the URL database 288, a copy of the access request is intercepted by a process 382. Portions of the access request are extracted and collected (step 384) and added to stored Access Data Resources 386. On the basis of the stored Access Data Resources, a statistical analysis is performed in a ranking step 388, and the results of the statistical analysis are stored as part of the URL database 288 as one of the characteristics of the URL numeric code. Additionally, theme information can be developed at step 390 and thus becomes part of the URL database.

The access data, once analyzed and made part of the URL database 288, represents both a valuable property and information about private concerns of users. In a specific embodiment, the access data relating to a particular user is available to the user via the network. The firewall 376 of FIG. 21 provides a means for protecting the privacy of the access data. Once the identity of a requester has been successfully authenticated, access data relating to the requester is provided to the requester.

In another embodiment, portions of the access data define an audience rating for a particular URL and its corresponding simplified network address, usually a URL numeric code.

In another embodiment, predetermined and non-sensitive portions of the access data are distributed to all requesters.

A Simplified Network Addressing System

A specific embodiment of the invention defines a system for accessing network information using a simplified network address. The system includes a software/hardware platform which accepts inputs for accessing network information. The platform includes an input device for accepting a user input of the simplified network address in the form of a simplified network address, such as a URL numeric code. The system also includes a server-based, network-searchable database storing correspondence relations between the simplified network addresses and corresponding URLs. The server-based database includes a search engine for searching the correspondence relations. When a user inputs a simplified network address, the address is sent to the server-based database and there the simplified network address is used as a search key. The database search engine looks for a correspondence relation having a simplified network address portion matching the simplified network address, and returns the corresponding URL. The system platform uses the returned URL to form a network access command for accessing the network information. Such a system is illustrated in FIGS. 1, 2 and 6. All the elements and relationships defined by this embodiment have been discussed above with respect to those drawing figures.

A Storage Medium for Distributing a Network Access Process

A final embodiment of the invention provides a storage medium, for example floppy disks, removable hard drive systems, CD ROM, and magnetic tape, for storing and distributing an encoded expression which embodies a process for accessing network information using simplified network addresses. The encoded expression is executable on a platform such as described above with respect to FIGS. 1, 2, 6 and 7 in which a database of correspondence relations is partitioned between a local cache and a remote server-based system. The process will be further discussed below with respect to additional FIGS. 22–27.

In a specific embodiment, the process is stored on the medium in an encoded form, such as in a compressed object code which is expanded after being loaded onto the platform. The stored process is what is normally distributed by a software developer to users. The process presupposes the existence of (1) a suitable hardware/software platform for execution of the process, (2) a network having network accessible resources, including the server-based database of correspondence relations as described above, and (3) a platform connection to the network for accessing the resources.

In particular, the platform provides network access and accepts simplified network addresses for accessing network information. The network includes a network server-based database defining a correspondence relation between simplified network addresses and corresponding URLs. The server-based database includes a search engine using a search key for searching the database. The database is organized such that a search of the database using a simplified network address as the search key returns a corresponding URL. The platform also includes a local cache for storage of selected correspondence relations. In a specific embodiment, the contents of the local cache are organized in a manner similar to the organization of the database correspondence relations. In another embodiment of the local cache, the contents are organized in the form of bookmarks. The platform provides a search engine for searching the local cache, and a windowed operating system displaying a composite window having an address window portion and a network window portion.

In a specific embodiment, the stored process permits the local user to place selected correspondence relations into the local cache. The USER inputs a simplified network address for a particular network resource and the simplified network address is displayed in the platform address window. The simplified network address is forwarded to the local cache search engine and forms a search key used to determine whether the cache includes a matching correspondence relation. If the cache does contain a matching correspondence relation, the URL corresponding to the simplified network address is used to form a network access command of the <http://URL/> type. This command is sent onto the network and eventually the desired network resource is returned and displayed in the platform network display window.

When a matching correspondence relation is not located within the local cache, a copy of the simplified network address is used to form a network access command of the <http:// . . . /simplified network address /> type. This command is sent onto the network to the server-based database of correspondence relations. The server-based database search engine uses the <simplified network address> as a search key and examines the contents of the database for a correspondence relation matching the search key. The server-based database then returns a URL corresponding to the simplified network address. The platform receives the corresponding URL and uses it to form another network access command of the <http:// . . . /> type. This command is sent onto the network to access the desired network resource. When the resource is eventually returned via the network, it is displayed in the platform network display window.

ADDITIONAL EMBODIMENTS

Various additional embodiments of the invention will now be described with respect to FIGS. 22 through 27.

Figure 22:
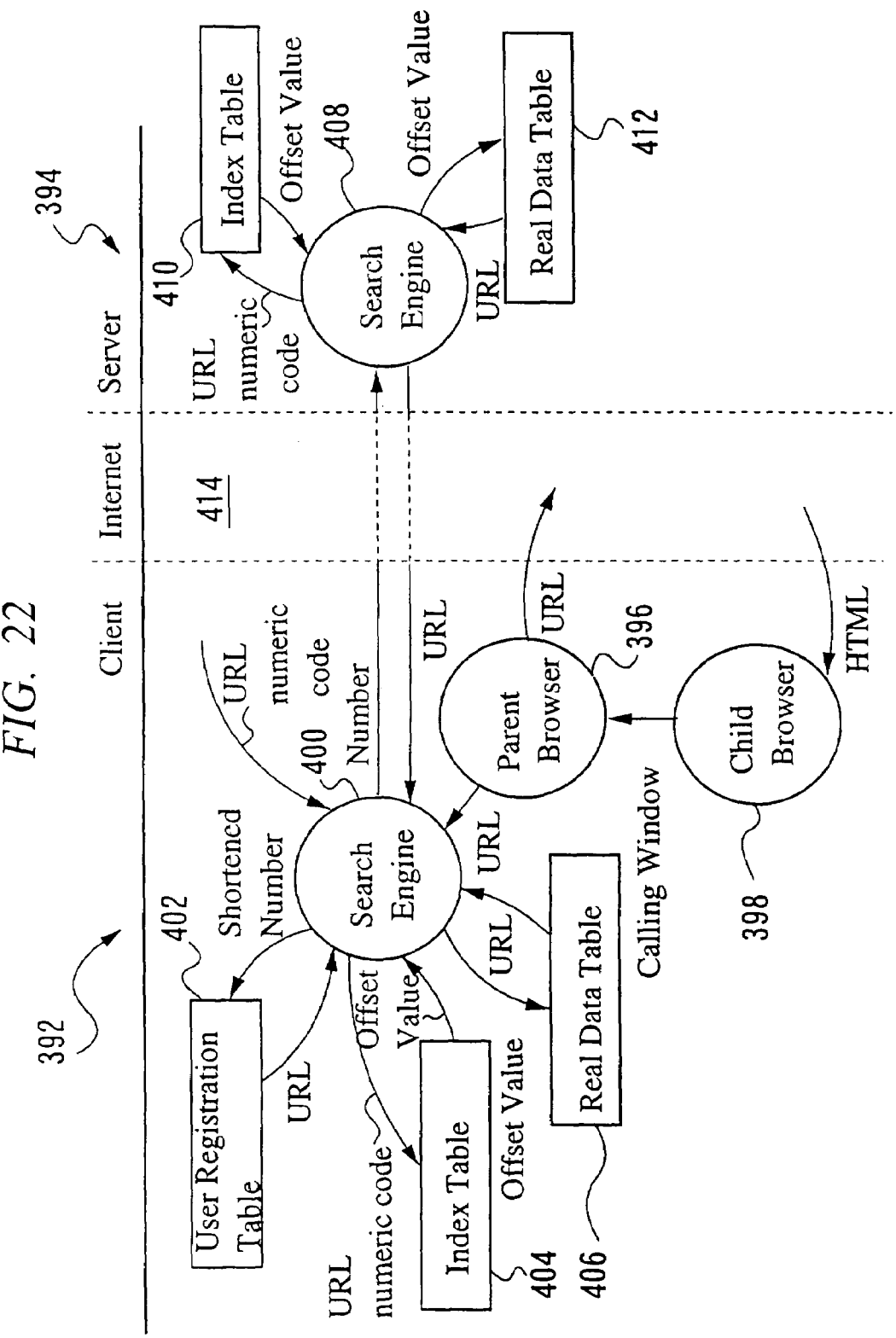
FIG. 22 is a schematic diagram illustrating information exchange between software elements within a specific embodiment of a client, within a server-based database and between the client and the database across a network.

FIG. 22 is a schematic diagram illustrating information exchange between software elements within a specific embodiment of a client, within a server-based database and between the client and the database across a network. The client is designated generally by the numeral 392, while the database is designated generally by the numeral 394.

Generally, the client 392 first accesses its own simplified network addresses, such as URL numeric codes. When conversion to a URL is not possible on the client side, the client 392 accesses the database on the side of the server 394. This procedure is exemplified in FIG. 22. A client 392 includes an original parent browser 396 for assisting navigation, a common WWW-type child browser 398, which can be called from the parent browser, and a search engine 400. The client 392 also includes a user registration table 402 which the user can utilize to register shortened URL numeric codes, having a pre-assigned correspondence relationship with the respective URL numeric codes, an index table 404 containing the URL numeric codes, a real data table 406 having URL numeric codes corresponding to the indexes. The parent browser 396 on the client side 392 includes a direction part in which the alphabetical letters are allocated as shown in detail in FIG. 15 and a display part for displaying the contents in the direction part.

FIG. 22 shows the server 394 which includes a search engine 408, an index table 410 for the assigned URL numeric codes and a real data table 412 for all URL numeric codes corresponding to the indexes. The server and the client are connected through the Internet, which is designated by the numeral 414.

When the user inputs a shortened number in the system, the search engine 400 searches for this number in the user registration table 402 and when found, converts it to a URL. The Internet 414 is then accessed through the parent browser 396 using the corresponding URL. As a result, a home page corresponding to the URL is displayed on the child browser 398 on the basis of the HTML data sent through the Internet 414. When the user inputs a URL numeric code, the search engine 400 obtains an offset value from the index table 404 and then converts the URL numeric code into the URL using this offset value and the real data table 406 of the URL numeric codes. The resulting URL is then delivered to the parent browser 396, and information which is obtained through the Internet 414 is displayed as described above.

Thus, when the conversion of a URL numeric code to a URL is executed on the client side 392, the access speed is similar to the usual access speed.

However, when the conversion of a URL numeric code to a URL is not possible on the client side 392, the search engine 400 on the client side transmits the URL numeric code to the search engine 408 on the server side 394 through the internet 414. In that case, an offset value is obtained from index table 410 on the basis of the URL numeric code input, and the transmitted number then is converted to a URL by using the real data table 412 for all URL numeric codes on the basis of that offset value. The resulting URL is then sent from the server to the client 392. The client 392 obtains the information through the Internet 414 and the home page is displayed in the same manner as described above in the method wherein the URL is delivered to the parent browser 396.

Thus, when a user inputs a shortened number which is personally registered by the user, or when the user inputs a URL numeric code, or even if the user inputs a URL numeric code which cannot be converted to a URL on the client side 392, it is still possible to convert the URL numeric code to URL and to access the Internet 414 through the parent browser 396 and to thereby display a home page corresponding to a URL on the child browser 398.

Figure 23:
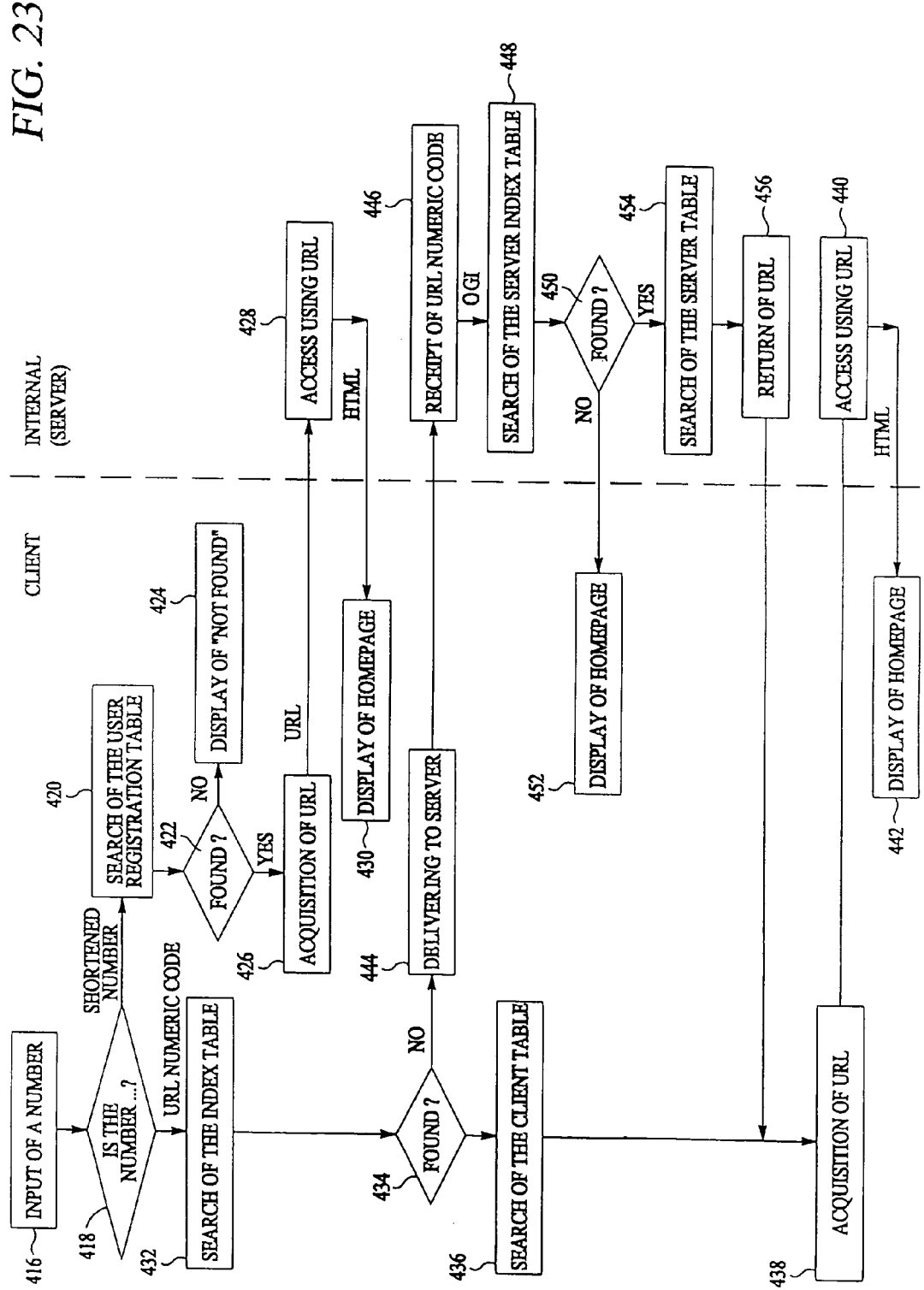
FIG. 23 is a flow diagram illustrating the process of inputting a URL numeric code or a shortened number and obtaining the resulting URL and home page.

FIG. 23 is a flow diagram illustrating the process of inputting a URL numeric code or a shortened number and obtaining the resulting URL and home page. The process starts by inputting a number in an input device 416. It is decided in step 418 if the number is a shortened number of a URL numeric code. If the number is a shortened number, the user registration table is searched (step 420). Next, it is decided if a URL is found which corresponds to a shortened number (step 422). If a corresponding URL is not found in step 422, the system will respond by displaying <not found> in step 424. If however a corresponding URL is found, it is acquired (step 426). The Internet is then accessed in step 428 using this URL and a home page corresponding to the URL is displayed based on the HTML data obtained through the Internet in step 430.

When the number which is searched in step 418 is a URL numeric code, the index information is searched in the Index Table (step 432). In step 434, it is decided if the index is found or not. If the index is found, the client table is searched (step 436) to obtain a URL corresponding to the URL numeric code in step 438. The URL which is thus acquired is then used to access the Internet (step 440), and the home page is displayed (step 442) using the home page HTML data. If however, no index number is found in step 434, the number is then delivered (step 444) to a server which is connected to the Internet. The search engine of this server receives the number (step 446). This server then searches the index information in its Index Table in step 448. If an index is not found in step 450, the number is not registered in this server and a home page is displayed in step 452 which indicates that the required URL was not found. On the other hand, if an index is found, a server table is searched in step 454, and a URL corresponding to the URL numeric code is returned to the client in step 456. The URL which is thus acquired is then used by the client to access the Internet (step 440) and to display the home page (step 442) corresponding to the URL on the basis of the HTML data sent through the Internet.

As described above, a number which is inputted as a shortened number or a URL numeric code can be converted to a corresponding URL. Additionally, this conversion can be executed by searching the database of a server if the conversion can not be executed on the client side. The present invention is thus based on assigning a number of relatively few digits, referred to as a URL numeric code, to a URL having a long and complex character string. This makes it possible to access the Internet by inputting the URL numeric code to eliminate the user's inconvenience. The invention thus provides access to the Internet by persons who are not accustomed to using a keyboard because the user does not need to know and to use a long and complex URL character string.

Additionally, when a URL numeric code is inputted, data concerning URL access corresponding to the URL numeric code can be saved. It is then possible to utilize access frequencies for statistical information in order to develop ranking information which sums up how often a URL numeric code is used. This can also be used to develop statistical information which is gathered according to themes and the like, to determine and to analyze audience ratings on the Internet. It is also possible to provide a URL numeric code on a paper medium such as a business card, to provide a more complete media link between the Internet and the media according to the URL owner's needs. As a result, updated information associated with a URL can be efficiently printed and provided. For example, if a URL owner changes the URL, such as when a company owning a URL changes its name, the existing URL numeric code can be maintained even if the URL string changes, by updating the database such that the existing URL numeric code now corresponds to the new URL.

Figure 24:
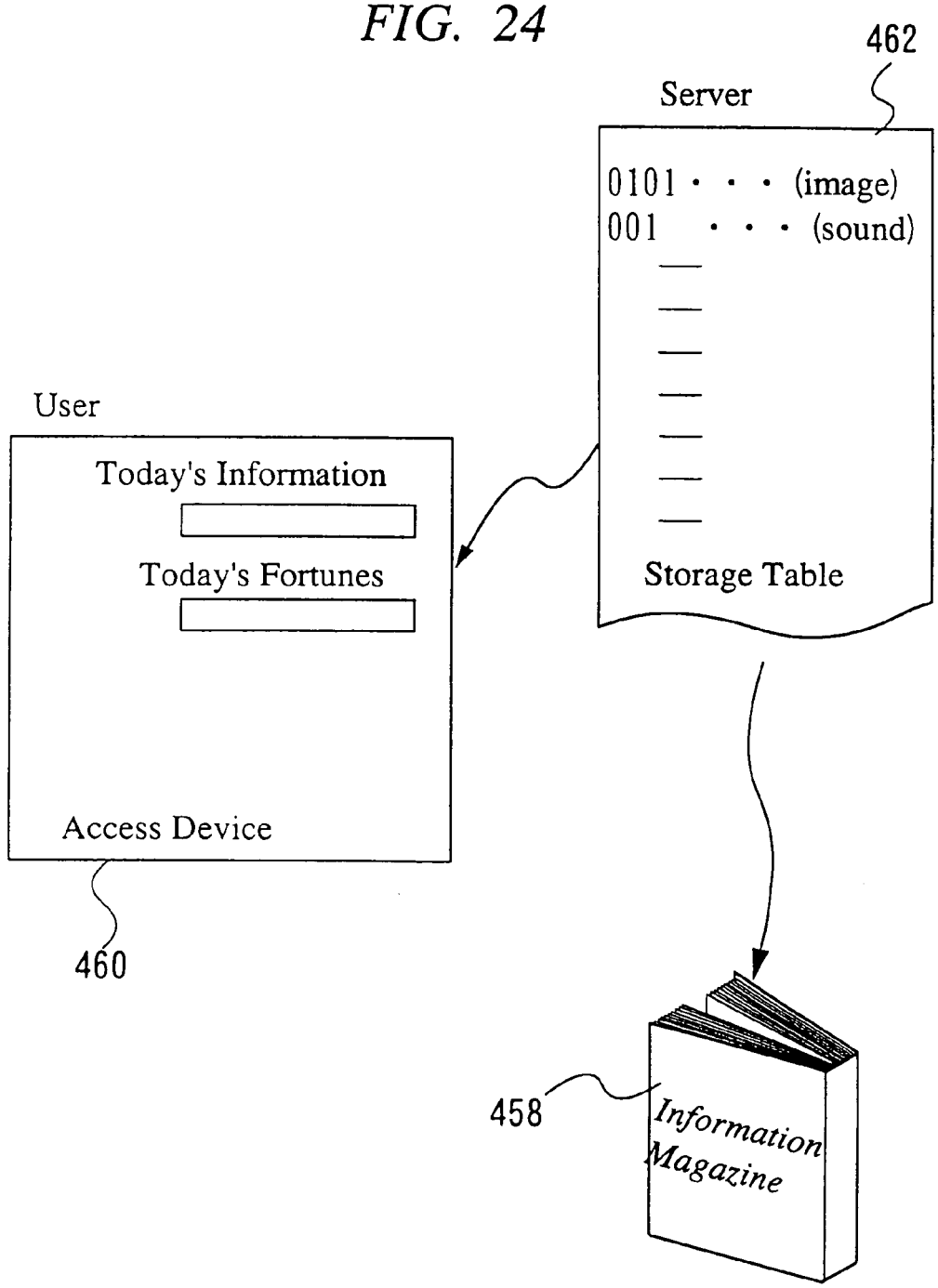
FIG. 24 is a pictorial diagram illustrating another aspect of the invention.

FIG. 24 is a pictorial diagram illustrating another aspect of the invention. Users of URL numeric codes can be provided with information regarding URL numeric codes through a printed medium, such as an Internet information magazine 458 (FIG. 24). However, such magazines are published monthly while URL numeric codes will be added almost daily. Therefore, it is impossible to provide information regarding newly issued URL numeric codes on a timely basis. To provide URL numeric codes on a more timely basis, a system such as the one shown in FIG. 24 can be utilized. This system has an additive function as follows. Upon starting an access device 460, a server 462, which is on-line on the Internet, displays on the screen of the access device the URL numeric codes for home pages which suit the user's preferences such as information by genre, for example, sports or music as designated by the user according to the user's interest and, for example, information regarding fortune telling based on information provided by the user, utilizing such numbers as the user's birth date. In this manner, newly registered URL numeric codes are provided to the user on a timely basis, for example, through weekly updates.

Using the above method, a user can obtain knowledge regarding his favorite genre on a timely basis. Also, a URL owner can provide his target users with his URL numeric code in accordance with a user's profile, and can thereby increase the likelihood that the home page will be seen by many users. Additionally, the URL owner can further increase the likelihood that his home page will be accessed, by providing the URL numeric code through radio announcements or by displaying the URL numeric code on the TV. This provides URL numeric codes by radio voice announcement or TV display.

Figure 25:
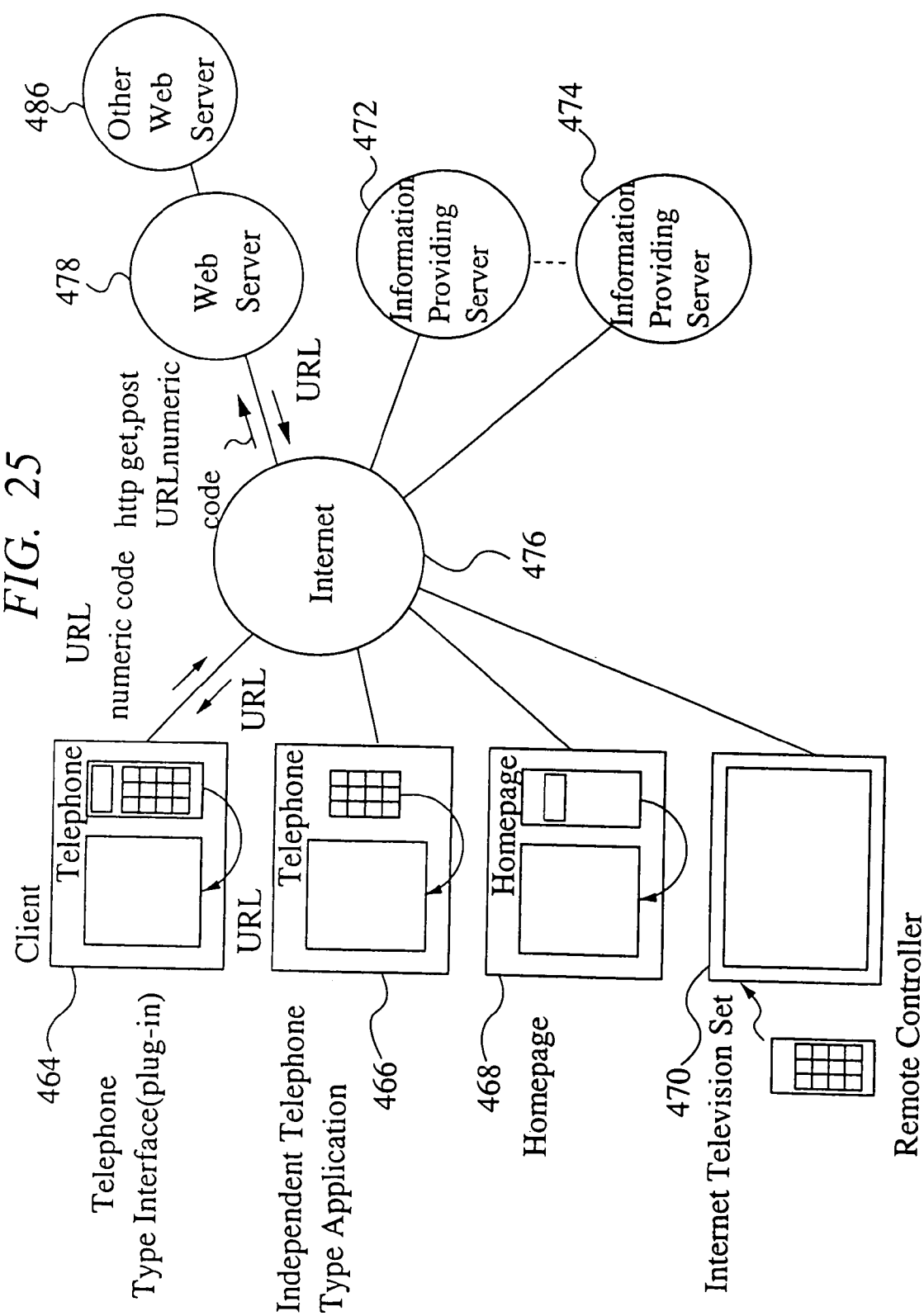
FIG. 25 is a pictorial diagram which shows an Internet system including a number input interface.

FIG. 25 is a pictorial diagram which shows an Internet system including a number input interface. This system has the following clients: a telephone type interface (plug-in) 464, an independent telephone type application 466, a home page 468 and an Internet Television set 470. This system further includes information providing servers 472 and 474. The clients and the information providing servers are connected with a web server 478 through the Internet 476. Communication between the Web server 478 and the client is made using the HTTP protocol. When the Internet 476 is to be accessed, the client such as 464 makes a request to the Web server 478 using a method such as <GET> or <POST> in the HTTP protocol. This is based on the method that, when a specification for the method is opened, access to the Web server can be made according to a formula which is fitted for the Web server, without limiting this to a particular interface of clients 464 through 470, thereby providing a URL which corresponds to the access. As a result, a client such as 464 through 470 is not limited to a specific interface.

Examples of suitable client interfaces are as follows. An original telephone type interface which is a plug-in type method. Various other forms of interfaces can be adapted for clients 464 through 470 such as an independent telephone type of application, a home page having a frame for inputting within the home page, etc. A basic principle of the number input interfaces is that a URL numeric code is inputted to the original Web server from clients such as 464 through 470, and a URL corresponding to the URL numeric code is returned to a browser of the client. An example of a suitable browser for this application may be an Internet navigator which is owned by the user, providing it can provide the URL to the browser.

Accordingly, access to the Internet is described as follows. One part includes an interface on the side of a Web server 478 which gives a desired result for a given parameter. Another part in which the parameter is provided to receive the result on the client side of clients 464 through 470. An additional part in which the received URL is provided to the browser. Following are examples of these applications.

For example, the client can include a plug-in telephone interface such as client 464 depicted in FIG. 25. This is achieved by installing on client 464 software which is stored, for example, on a storage medium such as a floppy disk or on a CD-ROM. The software includes the computer processing steps of receiving a number, such as a URL numeric code, accessing the Internet 476 by adding the number to a method of using an access protocol, sending the number to the Web server 478, receiving the URL corresponding to the number, and providing the corresponding URL to the client 464. Instead of using software which is available on a storage medium the invention is equally operable when the software is downloaded from a network and installing the software on a client, such as client 464. The invention is also equally operable when the software is available from an application library, known as applets which are located on a network. When applets are used, the software is not installed in the client but is used by executing the desired applet on the network. The use of applets is particularly suitable for use with devices which do not have a memory function or which can not use a floppy disk. Examples of these devices include an Internet TV, a game machine and a Karaoke set.

Client 470 (FIG. 25) illustrates an additional example, wherein an Internet TV can have a search navigator home page for the Internet. The navigator can have a component (plug-in) for inputting a number. This component can be a remote controller for the TV. A method can be used to input a URL numeric code in the remote controller to obtain the URL corresponding to the URL numeric code.

In the number input interfaces of the current invention the method is adapted for various forms of interfaces. Namely, there is a publicly open method using as one parameter in the <GET> command of the HTTP protocol, data of <no=123> for example are given as the URL numeric code, upon which the corresponding URL is returned. This <http://> is a notation in the HTTP protocol for transferring hyper text in HTML. This protocol includes methods such as <GET> for receiving a parameter and <POST> for transferring a file. Thus a URL numeric code can be converted using existing techniques.

In the present example, the conversion data for converting a URL numeric code to a URL are held on the side of client such as client 464 through client 470 (FIG. 25), unlike embodiments wherein the conversion can be carried both in a client and in an original Web server. For example, when the user inputs a URL numeric code <123>, the corresponding URL <www.123.co.jp> is obtained from an original Web server. Subsequently, if the user inputs the same <123> number again, the Web server is not accessed and the conversion is executed on the client side, by using a cache which is present in the client memory. This cache is capable of holding data such as a URL numeric code inputted in the cache and the corresponding URL. When a user inputs a URL numeric code the cache is searched for this number. If the number exists in the cache, the URL can be obtained on the side of a client such as clients 464 through 470 without accessing the Web server 478.

Figure 26:
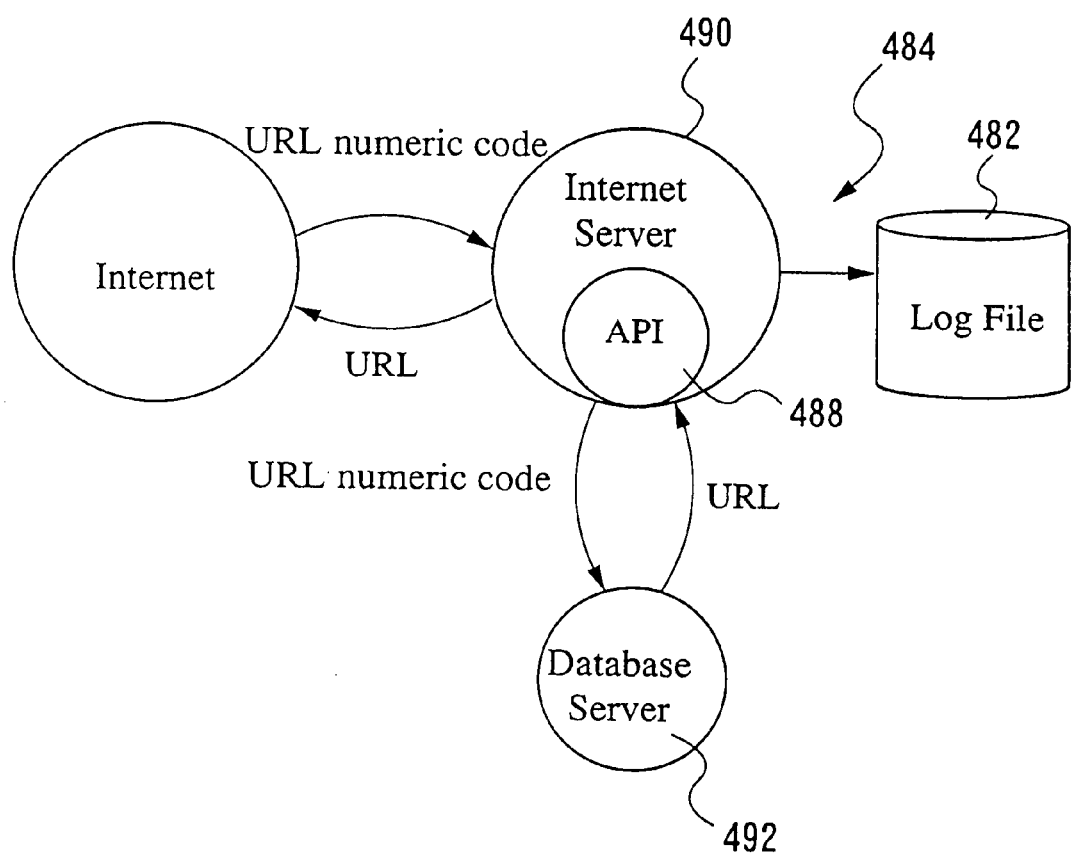
FIG. 26 is a schematic diagram illustrating a specific embodiment of the invention.
Figure 27:
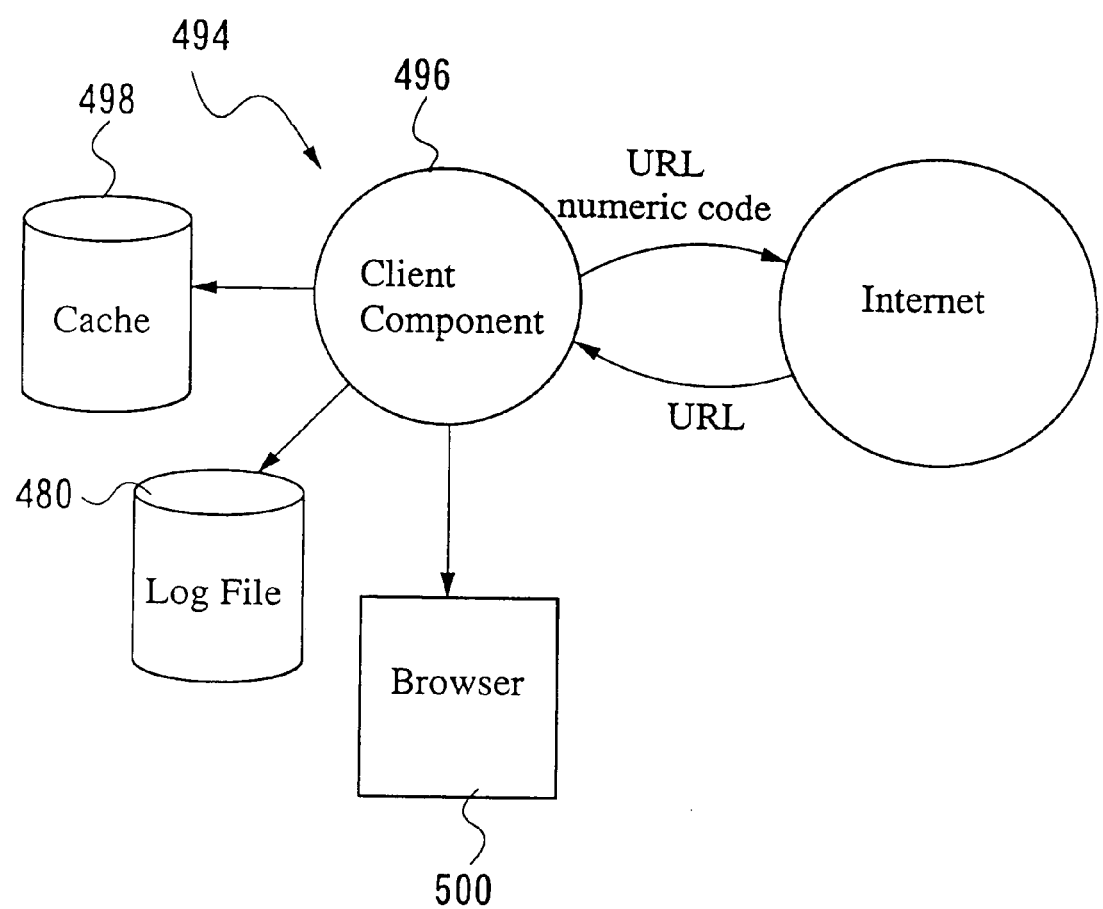
FIG. 27 is a schematic diagram illustrating another specific embodiment of the invention.

FIGS. 26 and 27 are schematic diagrams illustrating specific embodiments of the invention. As shown in FIG. 27, a client's access information can be stored in a log file 480. Information in log file 480 is accumulated and then sent to log file 482 (FIG. 26) of the original Web server (478 of FIG. 25). The information which is contained within log file 482 can be utilized by an information providing server 472 or 474 (FIG. 25) to analyze the log data. This analysis can include ranking information or audience rating by frequency of user access. Such information can also be classified according to genre, user's sex, equipment details, etc.

When a URL owner registers a URL numeric code additional information is obtained and added to the database of registered URL numeric codes such as technical information or the home page topic. For example, if a child accesses a home page having sexually explicit material, the original Web server 478 (FIG. 25) identifies this and returns the message <not found> without displaying the home page. If a limited type of browser is used such as an Internet TV or the like, it is possible that the latest technical information can not be displayed. Thus, before accessing an information providing server 472 (FIG. 25) in the step of accessing an original Web server (478 of FIG. 25), users can be identified, and access to certain home pages can be limited such that access is provided only to specific users. In addition to limiting home page display, data stored in log file 480 (FIG. 27) can also be limited for certain users.

A client such as client 464 (FIG. 25) accesses a Web server 478 through the Internet 476 as shown in FIG. 25. When the client accesses the Internet an identification can be added to the HTTP protocol, or a part of the URL numeric code can be used such that conversion of the URL numeric code to a URL can be executed either in the Web server 478 or in another Web server 486 (FIG. 25) which is connected through the Web server 478. For example a classification code can be used such that an identification code <888> causes the Web server 478 to convert the URL numeric code to the URL, but when the classification code <001> is used another Web server 486 (FIG. 25), connected to the original Web server 478 processes the conversion. Thus, management of URLs corresponding to URL numeric codes can be executed in a Web server 486 which is different from the Web server 478.

The invention includes a variety of special device interfaces as input devices of a client such as client 464 through client 470 (FIG. 25). These special device interfaces include a remote controller for operating a TV, a remote controller attached to Karaoke set, in addition to a keyboard interface and a mouse interface. Additionally, a voice input interface can be used such that a user inputs a URL numeric code in a voice command or by using the sounds of a musical scale which correspond to the URL numeric code. Also, a voice input interface can be used wherein an original number is expressed in letters which correspond to specific numbers.

Additive services can be provided by means of the present invention, which differ from the functions of the Internet. For example, when accessing a Web server such as 478 (FIG. 25) with a URL numeric code, a free-of-charge service can be provided occasionally through a lottery system based on the URL numeric code. Or, by accessing a hidden number, a prize can be given to the user who has accessed the hidden number. Further, access data can be utilized as statistically processed information in order to derive a frequency of use by users and to analyze an audience rating through the Internet.

Details concerning the conversion part of the Web server are shown in FIG. 26. An application programming interface (API) 488 is built in an existing high-speed Internet server 490. The API 488 includes a server module which provides the URL numeric code to a database server such as SYBASE® (a registered trademark of Sybase, Inc.) 492. The database server then returns the corresponding URL to the API. This results in a high speed conversion of the URL numeric code into a URL.

As shown in FIG. 27, a conversion part of a client 494 includes a client component 496, having a memory such as a cache 498, and a browser 500 for home pages. A URL numeric code is communicated to the client component 496, which then accesses the internal cache 498 to obtain a URL corresponding to the URL numeric code. The URL is then provided to the browser 500. However, the URL numeric code is communicated to Web server 484 (FIG. 26) if the URL numeric code is not present in the internal cache 498.

As shown in FIG. 27, a client's access information can be stored in a log file 480. Information in log file 480 is accumulated and then sent to log file 482 (FIG. 26) of the Web server 484. The information which is contained within log file 482 can be utilized by an information providing server 472 or 474 (FIG. 25) to analyze the log data. This analysis can include ranking information or audience rating by frequency of user access. Such information can also be classified according to genre, user's sex, equipment details, etc.

In the above embodiments of the present invention, a URL owner exemplifies the person or entity which requests or registers a simplified network address having a correspondence relation with a URL. However, the invention is equally operable if any other person, party or entity requests or registers this correspondence relation.

Figure 28:
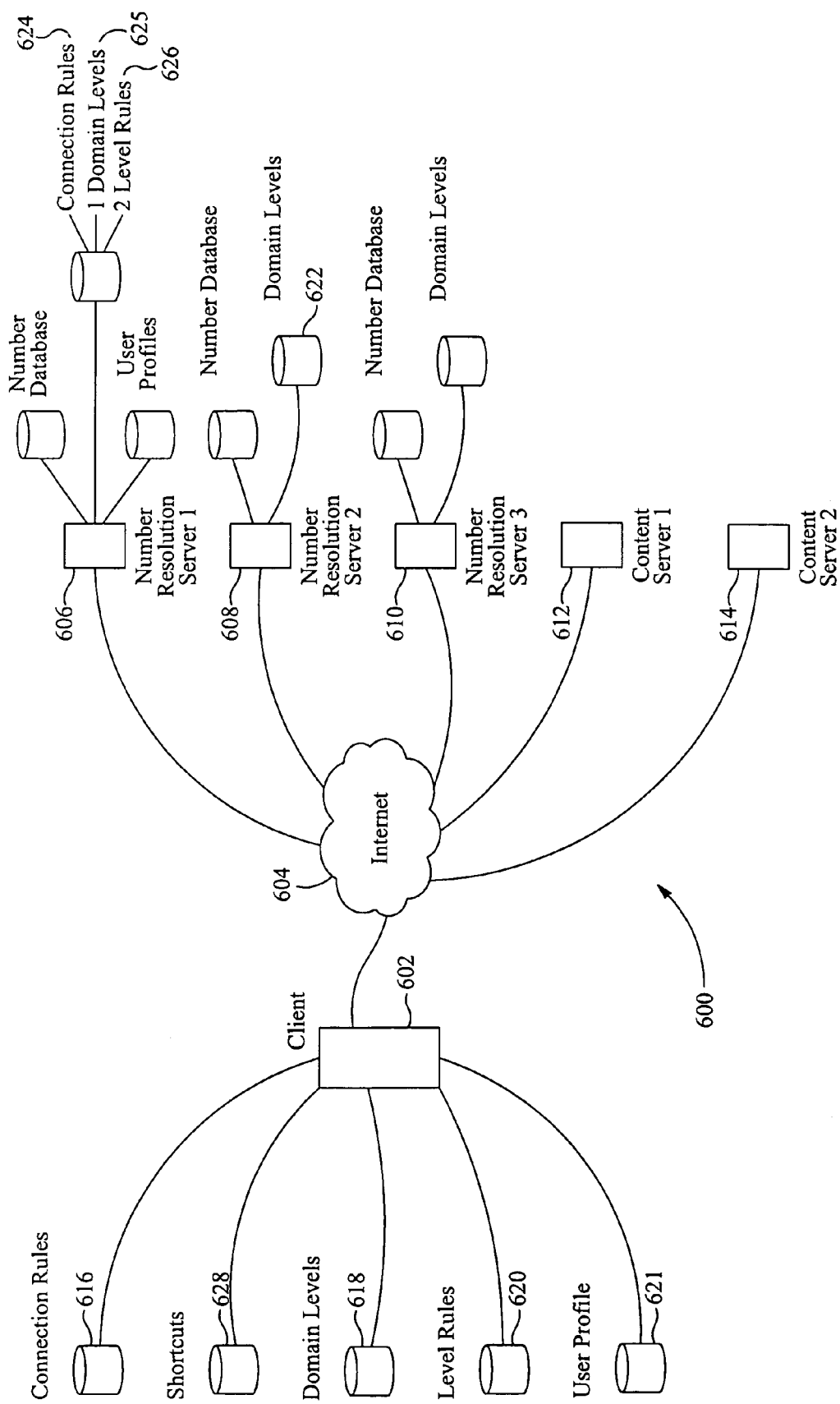
FIG. 28 is a block diagram illustrating an embodiment of the invention using message interception to simplify the conversion of URL numeric codes to URL's, and to add user profile information.

FIG. 28 is a block diagram that illustrates an embodiment of the invention using message interception to simplify the conversion of URL numeric codes to URL's, and to add user profile information to a content server request. The illustrated embodiment is a system, designated generally by the reference numeral 600 and includes a client platform 602 connectable via the Internet 604 with first, second and third number-resolution servers, 606, 608, 610, respectively, and first and second content servers 612, 614. It will be understood that the illustrated system is exemplary only and that an actual embodiment may contain many client platforms, number-resolution servers, and remote content servers communicating via a network such as the Internet.

In general, when a user inputs a simplified network address (also referred to above as a URL numeric code, and referred to hereafter simply as a "number") into the client 602, the client attempts to convert the number to a corresponding URL for addressing a specific content server. This process is referred to generally as "number conversion," and when carried out by a specialized number conversion subsystem, is referred to also as "number resolution." When the client lacks information necessary to complete the conversion on its own, the client sends the number to a number-resolution server, e.g., to the remote number-resolution server 606. The number-resolution server 606 receives the number, completes the conversion of the number to a corresponding URL (also simply "URL"), and returns the URL to the client 602. The client then uses the URL to address a request to a specific content server, e.g., the remote content server 612, to obtain a desired homepage.

It is desirable to have more than one number-resolution server within the system 600. The use of a plurality of such servers avoids the congestion and slowdown arising from reliance on a single remote number-resolution resource when many clients are attempting number conversions simultaneously. It is also desirable to have the number conversion process be transparent to the user so that the user is unaware that a number conversion is taking place. In a transparent process, the user simply types in a number known to the user to access a particular content server, and after a minimal delay, the desired content is displayed on the user's browser. The present invention defines such a transparent process.

A specific embodiment of the invention permits the client 602 to store user profile information, and to attach edited forms of such information to the URL when issuing a request to a remote content server. In general, the remote content server uses the user profile information to maintain statistical information related to the specific user, and to better meet the user's information needs. The amount and type of personal user information sent to the remote content server is regulated both by the user and by the type of content server being accessed. In a specific embodiment of the invention, the regulation of the amount and type of personal information is embodied in a set of rules implemented within the system.

FIG. 28, then, embraces these two concepts: enhanced simplified network address ("number") conversion, and the controlled release of user personal information according to a set of rules. In general, a portion of the rules is predetermined, while another portion is alterable by user input. The number conversion embodiments are considered first.

In a specific embodiment, the invention defines a method whereby a client 602 includes information permitting the client to send a number entered by a user to a specific number-resolution server 606–610 for conversion of the number to a corresponding URL. The client 602 decides which of the several number-resolution servers to use by consulting a connection rules table 616 (FIG. 28) accessible to the client. In this specific embodiment, the table permits the client 602 to make the decision based on a portion of the number entered by the user. This technique permits the client to classify the numbers so that different numbers are sent to different number-resolution servers to distribute the load on each server.

For example, assume a user inputs a 10-digit number beginning with the digits "03". The client searches the connection rules table 616 and finds that numbers beginning with the digits "03" should be sent to a telephone directory server (number-resolution server) based in Tokyo. Alternatively, assume that the user inputs a 10-digit number beginning with the digits "06", indicating that the client should send this 10-digit number to a telephone directory server located in Osaka. An example of such a table of connection rules is shown here:

| Number Pattern | Number-Resolution Server URL |
| --- | --- |
| 03xxxxxxxx | www.tokyo.com |
| 06xxxxxxxx | www.osaka.com |
| 2121xxxx | hatch.kachimai.co.jp |
| 104xxxxx | www.104web.com. |

Numbers fitting the pattern shown on the left hand side of the table are sent to a corresponding number-resolution server whose URL is shown on the right hand side of the table. Numbers not fitting any of the defined patterns are sent to a default number-resolution server 606 for conversion. One point worth noting with respect both to the default number-resolution server 606, and any number-resolution server 606–610: these servers usually perform many diverse tasks within the system 600; one of those tasks is converting a number to a corresponding URL.

In the preceding example, the "pattern" is the "03", the "06", the "2121" etc., while the "x's" represent additional digits of the number input by the user. Also, in the example, some of the numbers are 10 digits in length, while other numbers are less than 10 digits in length. The concept here is that a client-side table 616 is used by the client to send numbers matching the left hand "pattern" to the corresponding number-resolution servers whose URL's are shown on the right hand side. It will be appreciated that the "patterns" are exemplary only, and that digits other than the leading, or most significant digits, can be used to define a pattern also.

Again, the purpose of this method is to distribute number conversions among several number-resolution servers, rather than requiring a single, central server to make all number conversions. The method distributes the number conversion load among the available number-resolution servers 606–610 to prevent overload during periods of peak activity. Other advantages include protecting the distributed system 600 against failure of any single part of the system, a failure which would cripple the system if a failed server was required to handle all number conversions.

In a specific embodiment of the invention, each number-resolution server 606–610 is responsible for maintaining its own database of number/URL correspondences, with no need for complex replication of data between all the servers in the network. There is no need for all the data to be stored at a central server. This approach results in smaller individual databases, and faster access for users.

A person skilled in the relevant arts will appreciate that it is difficult to create a system in which keyword shortcuts are directed to different servers based on patterns. Thus, keyword systems always contact a central server to have the keyword converted to a corresponding URL. Numbers, on the other hand, can be grouped naturally, making it much easier to send requests for numbers falling into different ranges/patterns to separate servers, and reducing the reliance on a central server. The present invention employs this natural characteristic of numbers to solve an otherwise difficult problem within the context of a simplified network addressing system.

A second group of embodiments of the present invention relates to the gathering and the selective dissemination of personal information related to a user, e.g., a user's age, address, online activity, buying preferences, etc.

With continued reference to FIG. 28 and to system 600, one such embodiment defines a method whereby a client 602 contacts a central server 606 upon initial startup to receive a unique user identification number that will be saved by the client 602. Thereafter, this user identification number will be sent to a number-resolution server 606–610, along with a simplified network address number, each time a user requests a number conversion. The unique user identification number permits a number-resolution server to identify a user making the request, and is a separate number from the simplified network address number. In other words, the client 602 will obtain and save an identification number at startup, and when a user inputs a simplified network address number into the client, the client will send both numbers to an appropriate number-resolution server. The number-resolution server will convert the simplified network address number to its corresponding URL and return the URL to the client, and will use the unique user identification number to track usage, and, alternatively, to respond in a way specific to the identified user.

Another specific embodiment of the invention using the unique user identification number defines a method whereby a user can provide personal information which is sent by the client 602 to be stored at a central server 606 along with the unique user identification number for the purpose of generating meaningful statistics about the client software usage, and for delivering more meaningful information to the user based on a user profile.

In another specific embodiment of the invention, the client 602 stores a copy of user information in a table 621 located at the client. The stored user information defines a user profile.

In another specific embodiment of the invention, varying levels of user information can be communicated to content servers on the Internet, not only when an Internet number is inputted, but also when the user clicks any link within a homepage, or enters a URL directly into the browser location field.

In a specific embodiment, a message intercepting mechanism of the client software detects when a link is clicked (or when a URL is entered into the browser location field), captures the generated message and modifies the URL within that message to include user information before sending the request to a content server 612, 614 (FIG. 28). Therefore, user information is transferred to the content server along with each URL request.

Another specific embodiment of the invention defines a method permitting a client 602 to determine what level of user information to send to different content servers consisting of two tables. One table 618 containing the level code and the domain names with access to that level of user information. Along with another table 620 defining rules for different access levels, and information available to sites according to their access level. Information sent to a central server 606 is detailed, but information sent to content servers 612, 614 is modified to be less identifying, based on rules stored on the client 620, for example: ages changed to age-ranges, addresses changed to country, state, or suburb, etc. A person skilled in the art will appreciate that, though restricted, such modified information is still useful to the content servers.

The following example illustrates the use of user personal information in the above-described embodiments. Assume the user is 23 years old and lives in the suburb of Shinjuku in the city of Tokyo, Japan, and has registered his personal information. Assume the user clicks on http://www.yahoo.com/. The client software captures the message before it reaches the browser and extracts the domain name portion. Following this, it looks up the domain "yahoo.com" to determine the level of user information to send to this site, using the domain level table 618:

| Level | Domain |
|-------|--------|
| 1 | ibm.co.jp |
| 1 | geocities.com |
| 2 | yahoo.com |
| 3 | compaq.com. |

After determining Yahoo has access to level 2 information, the client extracts level 2 personal information from a separate table of level rules 620 (FIG. 28) as shown below:

| Level | Address | Age |
|-------|---------|-----|
| 1 | Shinjukyu | 20–25 |
| 2 | Tokyo | 20–30 |
| 3 | Japan | 15–35. |

Using such a table of level rules, the client software can modify the user information stored on the client according to rules 622 associated with the access level of a specific content server. The client can append user information to the URL (www.yahoo.com) and pass a message to the browser causing it to redirect the user to the URL thus passing along user information. In this specific example, the final URL sent to the content server would appear something like http://www.yahoo.com/#age=20–30&Address=Tokyo.

In a specific embodiment, the user personal information is encrypted before being sent across the network to further protect the privacy of the individual user.

Finally, another group of specific embodiments relates to the automatic updating of software. One embodiment defines a method for the client software component to communicate with a group of central servers 606 on a regular basis in order to download updates to itself. Typical downloads include: (1) a table of new servers 624 added to the system and their associated number ranges; (2) a table of content servers 625 and the level of user information they are to receive; (3) a table of rules 626 regarding the type/range of user information to send to content servers of specific access levels; and (4) various additional client updates/features.

The client 602 is also capable of uploading information (such as user information, and shortcuts) to the server.

Another specific embodiment defines a method whereby a user can assign a number to identify a networked resource. This nickname or shortcut is saved locally by the client. Upon input of a number, the local database of shortcuts 628 is searched for a match, if a match is obtained, the user is redirected to the matching resource, if not, the client chooses a server to search for a match depending upon the pattern/range of the number entered via the Connection Rules table 616, as described above.

As has been previously mentioned, message interception and modification play a central, if often hidden, role in many of the embodiments of the present invention.

Figure 29:
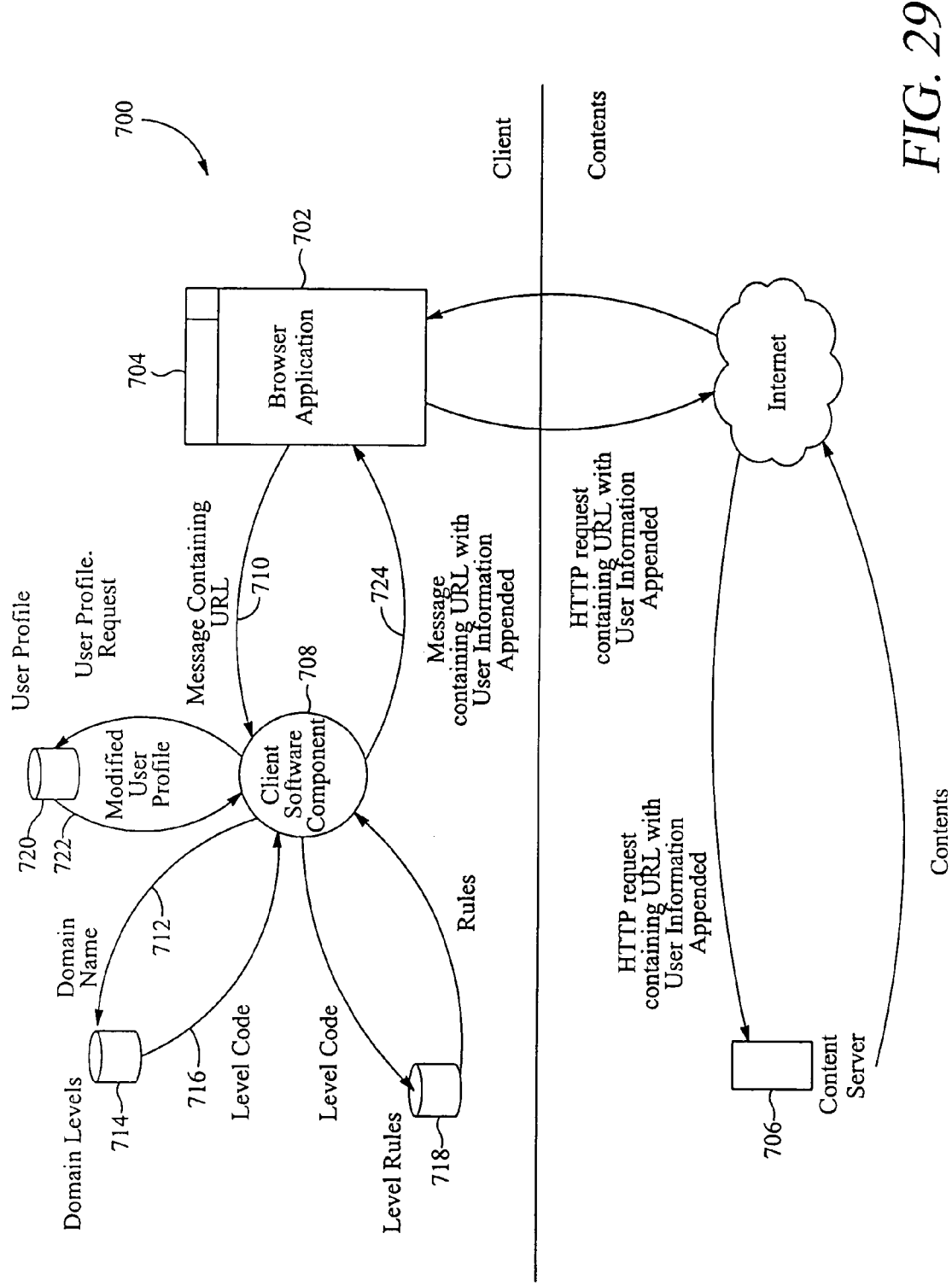
FIG. 29 is a block diagram illustrating a portion of the system shown in FIG. 28 relating to message interception and modification.

FIG. 29 is also a block diagram that illustrates the manner in which message interception and modification is used to accomplish the concepts embraced in FIG. 28. A typical message interception and modification process is designated generally by the reference numeral 700 and includes a browser application 702, a browser location field 704, a content server 706, client software 708, an intercepted message 710, an extracted domain name 712, a table of domain levels 714, a level code 716, a level rules table 718, a user profile 720, a modified user profile 722, and a composite message 724.

When a hyperlink is clicked within the browser 702, or a URL is entered into the browser's location field 704, to initiate a visit to a content server 706, the client software 708 intercepts the resulting message 710 before it reaches the browser.

From the message 710, the client software 708 extracts a domain name 712 of the server the user intends to visit (in this case, content server 706), and matches the extracted domain name 712 against a table of domain levels 714 which indicate the level of detail of user information the domain (content server 706) has access to. If a match is found in the table 714, a corresponding level code 716 is returned to the client software 708. If no match is found, then a default level of user information is available to the content server 706.

When a match is found, the level code 716 is then used by the client software 708 to lookup rules in a level rules table 718. Once a set of rules is obtained, the client can modify the user profile 720 according to the rules. The modified user profile 722 is then combined with the content server URL and passed as a composite message 724 back to the browser 702. The browser now uses this composite message 724 to access the content server 706, passing the modified user profile 722 to the content server with the URL.

Figure 30:
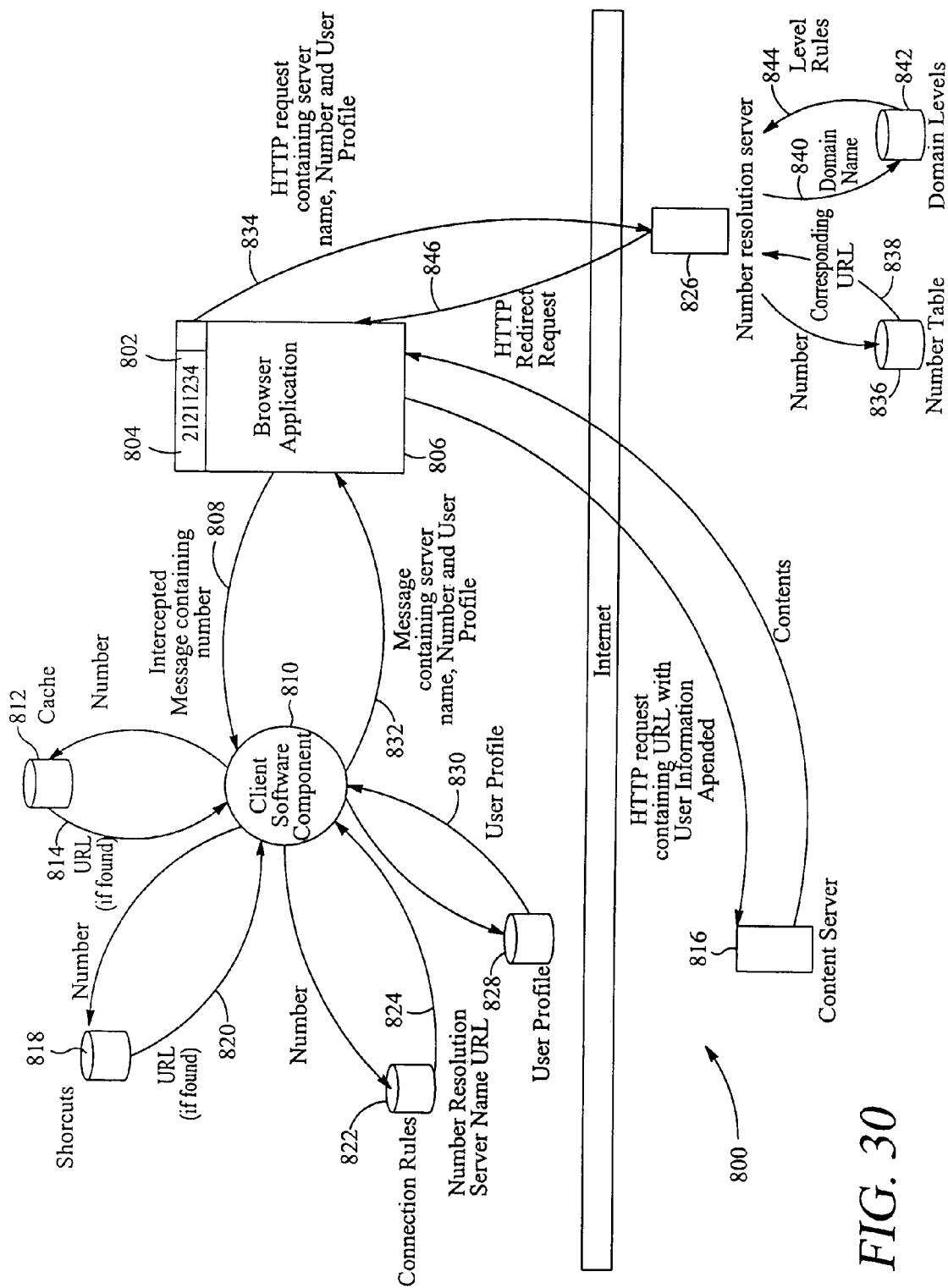
FIG. 30 is a block diagram illustrating another portion of the system shown in FIG. 28 relating to number resolution.

FIG. 30 is a block diagram that illustrates details related to the enhanced number conversion process, designated generally by the reference numeral 800. The illustrated number conversion process 800 includes a browser location field 802, a simplified network address number 804, a browser application 806, client software 810, a client-side cache 812, a content server 816, a table of user defined shortcuts 818, a connection rules table 822, a number-resolution server 826, a user profile table 828, a user profile 830, a composite message 832, a number table 836, and a domain levels table 842.

When a number 802 is entered into the location field 804 of the browser 806, the resulting message 808 is intercepted by the client software 810.

The client software 810 first attempts to look up the number entered 802 in the client side cache 812. If a result is found, then the resulting URL 814 is sent to the browser 806 which uses the URL 814 to connect to the appropriate resource on the Internet (content server 816). If a result is not found, the client software 810 checks the number 802 against a table of user defined shortcuts 818. If a match is found, the resulting URL 820 is sent to the browser 806 which connects to the appropriate resource on the Internet (content server 816).

If no match is found in the shortcut table 818, the client software 810 checks the number 802 against number patterns/rules in a connection rules table 822. If the number 802 matches a pattern in the connection rules table 822, then the URL of a number-resolution server (in this example 826) is obtained by the client software 810.

The client software 810 next retrieves the user's profile from a user profile table 828, and combines the URL 824 of the number-resolution server 826, the user profile 830, and the number 802 originally entered by the user, to create a composite message 832, and sends the composite message to the browser 806. The browser uses this composite message to create a request 834 to connect to the number-resolution server 826, and passes the user profile 830 and the number 802 to be resolved.

The number resolution server 826 uses a number table 836 to convert the number 802 into a corresponding URL 838. From the corresponding URL 838 the number-resolution server 826 extracts a domain name portion 840, and uses the domain name portion to look up the level of access the named domain 840 has to user information from a domain levels table 842.

Based on the value of a level code 844, the number-resolution server 826 modifies the user profile 830 accordingly. The modified user profile and the resolved URL are combined to create an HTTP redirect request 846 that is sent to the browser 806. This request 846 causes the browser to connect to the content server 816, passing the modified user profile. The content server then returns the URL-requested content to the browser 806, completing the process.

The embodiments described above with respect to FIGS. 28, 29 and 30 emphasize the client software component's (810 FIG. 30) ability to intercept a message intended for browser applications, modify the intercepted message according to some rules, and then forwarding the modified message to the browser. A person having an ordinary level of skill in the relevant arts will appreciate the client software can monitor messages for any application, not just browser applications. For example, a specific embodiment of the client software can monitor messages intended for an e-mail program, intercept and extract an e-mail address entered by a user, modify the address and then forward the modified address to the e-mail program.

The invention has been described in terms of specific embodiments. One skilled in the art will recognize that it would be possible to construct the elements of the present invention from a variety of means and to modify the placement of components in a variety of ways. While the embodiments of the invention have been described in detail and shown in the accompanying drawings, it will be evident that various further modifications are possible without departing from the scope of the invention as set forth in the following claims.

We claim:

1. A server-based, network-searchable database system, comprising:
   a) a platform providing a communications connection to the network;
   b) means for receiving a search request via the communications connections, the received search request including a simplified network address;
   c) a correspondence relation table defining correspondence relations between network Uniform Resource locators and simplified network addresses, a correspondence relation having a simplified network address portion and a corresponding Uniform Resource Locator portion;
   d) a search engine responsive to the search request for searching the table for a correspondence relation having a simplified network address portion matching the search request simplified network address, and for returning the Uniform Resource Locator portion of that correspondence relation as a result of the search;
   e) means for returning the result of the search to the originator of the search request, via the communications connections;
   f) the system also including means for receiving an assign-string request via the communications connection, the received assign-string request including an update Uniform Resource Locator;
   g) means responsive to the assign-string request for creating an update simplified network address, for forming a correspondence relation between the created update simplified network address and the update Uniform Resource Locator, for inserting the formed correspondence relation into the correspondence relation table, and for returning a copy of the created update simplified network address to the requester via the communications connection;
   h) the created update simplified network address defining a number having at least one digit, the number defining a URL numeric code;
   i) the means for creating an update simplified network address also including means for receiving and for displaying a string of letters;
   j) a ten-key pad wherein each key is marked with an operator-viewable digit ranging from zero through nine and marked with one or more operator-viewable letters selected from an alphabet such that each key defines a letter-digit correspondence;
   k) the viewable key markings permitting an operator to view the displayed string of letters, and to operate a key corresponding to each displayed letter in sequence;
   l) means for receiving digits from the key pad;
   m) means for forming the received digits into a received number;
   n) means for determining whether the received number has previously been assigned as the URL numeric code;
   o) means for assigning the received number as the URL numeric code when it is determined that the received number has not previously been so assigned; and
   p) means for modifying the received string of letters to form a new string, for displaying the new string, and for awaiting a key pad input of digits corresponding to the displayed new string when it is determined that the received number has previously been assigned.

2. A server-based, network-searchable database system, comprising:
   a) a platform providing a communications connection to the network;
   b) means for receiving a search request via the communications connection, the received search request including a simplified network address;
   c) a correspondence relation table defining correspondence relations between network Uniform Resource Locators and simplified network addresses, a correspondence relation having a simplified network address portion and a corresponding Uniform Resource Locator portion;
   d) a search engine response to the search request for searching the table for a correspondence relation having a simplified network address portion matching the search request simplified network address, and for returning the Uniform Resource Locator portion of that correspondence relation as a result of the search;

e) means for returning the result of the search to the originator of the search request, via the communications connections;

f) the system also including means for receiving an assign-string request via the communications connection, the received assign-string request including an update Uniform Resource Locator;

g) means responsive to the assign-string request for creating an update simplified network address, for forming a correspondence relation between the created updated simplified network address and the update Uniform Resource Locator, for inserting the formed correspondence relation into the correspondence relation table, and for returning a copy of the created update simplified network address to the requester via the communications connection;

h) the created update simplified network address defining a number having at least one digit, the number defining a URL numeric code;

i) the means for creating an update simplified network address also including means for generating a string of letters;

j) means for generating a first digit;

k) means for using the string of letters to form a four digit first derivative number;

l) means for using the first derivative number to form a four digit second derivative number;

m) means for concatenating the first digit and the four digit second derivative number to form a five digit number;

n) means for determining whether the five digit number has previously been assigned as the URL numeric code;

o) means for assigning the five digit number as the URL numeric code when it is determined that the five digit number has not previously been assigned;

p) means for providing first and second random digits and for concatenating the first random digit, the second random digit, and the five digit number to form a seven digit number when it is determined that the five digit number has previously been assigned as the URL numeric code;

q) means for determining whether the seven digit number has previously been assigned as the URL numeric code;

r) means for assigning the seven digit number as the URL numeric code when it is determined that the seven digit number has not been previously assigned;

s) means for providing third, fourth and fifth random digits and for concatenating the third random digit, the fourth random digit, the fifth random digit and the seven digit number to form a ten digit number when it is determined that the seven digit number has been assigned previously;

t) means for determining whether the ten digit number has previously been assigned as the URL numeric code; and u) means for assigning the ten digit number as the URL numeric code when it is determined that the ten digit number has not been assigned previously.

3. A system for accessing network information using simplified network addressing, comprising:

a) a client platform defining a client, the platform having network access and means for receiving a simplified network address;

b) a plurality of remote number-resolution servers responsive to the client via the network for converting a simplified network address to a corresponding URL;

c) the client platform including means for selecting a specific number-resolution server based on a function of a received simplified network address; and d) the client platform including means for sending the simplified network address to the selected number-resolution server, for requesting a conversion of the simplified network address to a corresponding URL, for receiving the corresponding URL from the selected number-resolution server, and for using the received corresponding URL to access network information.

4. A system for accessing network information using simplified network addressing, comprising:

a) a client platform defining a client, the platform having network access and means for receiving a simplified network address;

b) plurality of remote number-resolution servers responsive to the client via the network for converting a simplified network address to a corresponding URL;

c) the client platform including means for selecting a specific number-resolution server based on a function of a received simplified network address;

d) the client platform including means for sending the simplified network address to the selected number-resolution server, for requesting a conversion of the simplified network address to a corresponding URL, for receiving the corresponding URL from the selected number-resolution server, and for using the received corresponding URL to access network information; and e) wherein the simplified network addresses are numbers and the number-resolution selection function is based on a sequence of consecutive digits of the simplified network address numbers.

5. A system for accessing network information using simplified network addressing, comprising:

a) a client platform defining a client, the platform having network access and means for receiving a simplified network address;

b) a plurality of remote number-resolution servers responsive to the client via the network for converting a simplified network address to a corresponding URL;

c) the client platform including means for selecting a specific number-resolution server based on a function of a received simplified network address;

d) the client platform including means for sending the simplified network address to the selected number-resolution server, for requesting a conversion of the simplified network address to a corresponding URL, for receiving the corresponding URL from the selected number-resolution server, and for using the received corresponding URL to access network information;

e) wherein the simplified network addresses are numbers and the number-resolution selection function is based on a sequence of consecutive digits of the simplified network address numbers, and wherein the selection function uses pattern matching on consecutive leading digits of the simplified network address numbers.

6. A method for accessing network information using simplified network addressing, the method comprising the steps of:

a) providing a client platform defining a client, having network access and means for receiving a simplified network address;

b) providing a plurality of remote number-resolution servers responsive to a client request via the network for converting the simplified network address to a corresponding URL;

c) further providing the client platform with means for selecting a specific number-resolution server based on a function of the received simplified network address;
d) the client receiving the simplified network address;
e) the client determining which of the plurality of number-resolution servers to connect to for conversion of the simplified network address to a corresponding URL;
f) the client sending the simplified network address to the selected number-resolution server for conversion;
g) the client first attempting to make the conversion and if unsuccessful, then sending the simplified network address to a selected number-resolution server for conversion;
h) the selected number-resolution server converting the simplified network address to a corresponding URL and returning the URL to said client; and
i) said client using the returned URL to access the network information.

7. A method for accessing network information using simplified network addressing for use within an existing networked system including, at least, a plurality of number-resolution servers for converting simplified network addresses to corresponding URL's, the method comprising the steps of:
a) providing a client platform defining a client, having network access, means for receiving a simplified network address, and means for selecting a specific number-resolution server based on a function of the received simplified network address;
b) the providing the client platform step further includes the platform also having means permitting the client to convert a subset of simplified network addresses to corresponding URL's;
c) the client receiving a simplified network address and selecting a specific number-resolution server based on a function of the received simplified network address;
d) said client attempting first to convert the received simplified network address and if successful, using the resulting URL to access the network information, and if not successful, continuing with the step of selecting a number-resolution server to make the conversion;
e) the client sending the received simplified network address to the selected number-resolution server for conversion;
f) receiving the corresponding URL from the selected number-resolution server; and
g) using the corresponding URL to access the network information.

8. A computer program product for use with a computer system defining a client platform having network access, and means for receiving a simplified network address, the computer program product comprising:
a) a computer readable medium;
b) means provided on the medium for directing the computer system to perform the following steps, defining a method for accessing network information using simplified network addressing for use by the client within an existing networked system including a plurality of number-resolution servers for converting simplified network addresses to corresponding URL's;
c) wherein said means provided on the medium directs the client platform to perform the following additional steps: (1) defining client platform means for converting a subset of simplified network addresses to corresponding URL's, (2) defining client platform means for attempting to make the conversion after receipt of the simplified network address and before selecting a specific number-resolution server, (3) defining client platform means for using the result of a successful conversion to access network information, and if unsuccessful, for continuing with the step of selecting a specific number-resolution server based on a function of the simplified network address, (4) attempting to make the conversion and if successful, using the corresponding URL to access network information and (5) when not successful, continuing with the step of selecting a specific number-resolution server;
d) receiving a simplified network address;
e) selecting a specific number-resolution server based on a function of the simplified network address;
f) sending the simplified network address to the selected number-resolution server for conversion to a corresponding URL;
g) receiving the corresponding URL from the number-resolution server; and
h) using the corresponding URL to access the network information.

* * * * *